(12) United States Patent
Rutten

(10) Patent No.: US 12,092,068 B2
(45) Date of Patent: Sep. 17, 2024

(54) PELTON HYDRAULIC TURBINE AND INSTALLATION

(71) Applicant: RUTTEN—NEW ENERGY SYSTEM SA, Herstal (BE)

(72) Inventor: Jean Rutten, Blégny (BE)

(73) Assignee: Rutten—New Energy System SA, Herstal (BE)

( * ) Notice: Subject to any disclaimer, the term of this patent is extended or adjusted under 35 U.S.C. 154(b) by 0 days.

(21) Appl. No.: 18/468,040

(22) Filed: Sep. 15, 2023

(65) Prior Publication Data

US 2024/0003328 A1 Jan. 4, 2024

Related U.S. Application Data

(63) Continuation-in-part of application No. PCT/IB2022/051925, filed on Mar. 4, 2022.

(30) Foreign Application Priority Data

Mar. 15, 2021 (BE) .................... 2021/0023

(51) Int. Cl.
F03B 15/20 (2006.01)
F03B 1/02 (2006.01)
F03B 13/08 (2006.01)

(52) U.S. Cl.
CPC ............... *F03B 15/20* (2013.01); *F03B 1/02* (2013.01); *F03B 13/08* (2013.01)

(58) Field of Classification Search
CPC ........................................................ F03B 1/02
See application file for complete search history.

(56) References Cited

U.S. PATENT DOCUMENTS 2,140,230 A 12/1938 Jackson
2017/0045898 A1* 2/2017 Pohjola .................. G05D 16/16

FOREIGN PATENT DOCUMENTS

| DE | 0924560 | * | 3/1955 | |
| DE | 3938356 C2 | * | 5/1995 | ............... F03B 1/02 |
| EP | 3184807 A1 | | 6/2017 | |
| EP | 3321501 A1 | | 5/2018 | |
| FR | 1018242 A | | 12/1952 | |
| GB | 667129 | | 2/1952 | |

OTHER PUBLICATIONS

International Search Report and Written Opinion with English translation for related PCT Application No. PCT/IB2022/051925, 18 pages.
Ir R Vermeulen et al., Conception d'une turbine hydraulique de type Pelton a axe vertical, Gramme, Liege, Revue Scientifique Des Ingenieurs Industriels No. 32, 2018, XP002804663, cite dans la demands alineas (0.1), (02.1), (02.2), (02.3), figures 1-3.

(Continued)

*Primary Examiner* — Brian O Peters
(74) *Attorney, Agent, or Firm* — Hovey Williams LLP; Paul J. Walker

(57) ABSTRACT

The subject of the invention is a hydraulic turbine of the Pelton type suitable for driving an alternator with a determined net rated (nominal) power of 5 to 1000 kW with a maximum hydraulic pressure substantially equivalent to a maximum determined height of waterfall of between 70 m and 500 m.

37 Claims, 17 Drawing Sheets

(56) References Cited

OTHER PUBLICATIONS

Kumar et al., Design and implementation of pumped-hydro-compressed-air energy storage system, International Journal of Electrical Engineering Technology, Department of Electrical Engineering, Mehran University, Jamsboro, Pakistan, May 12, 2018, 6 pages.

Zidonis et al., Pelton Turbine: identifying the optimim No. of buckets using CFD, Journal of Hydrodynamics, Ser. B, vol. 28, Feb. 2016, pp. 75-83 (18 pages).

"Design of Pelton turbines" presentation, Web Article: http://www.ivt.ntnu.no/ept/fag/tep4195/innhold/Forelesninger/forelesninger%2006/5%20-%20pelton%20turbine.pdf; accessed on Dec. 2019, 28 pages.

* cited by examiner

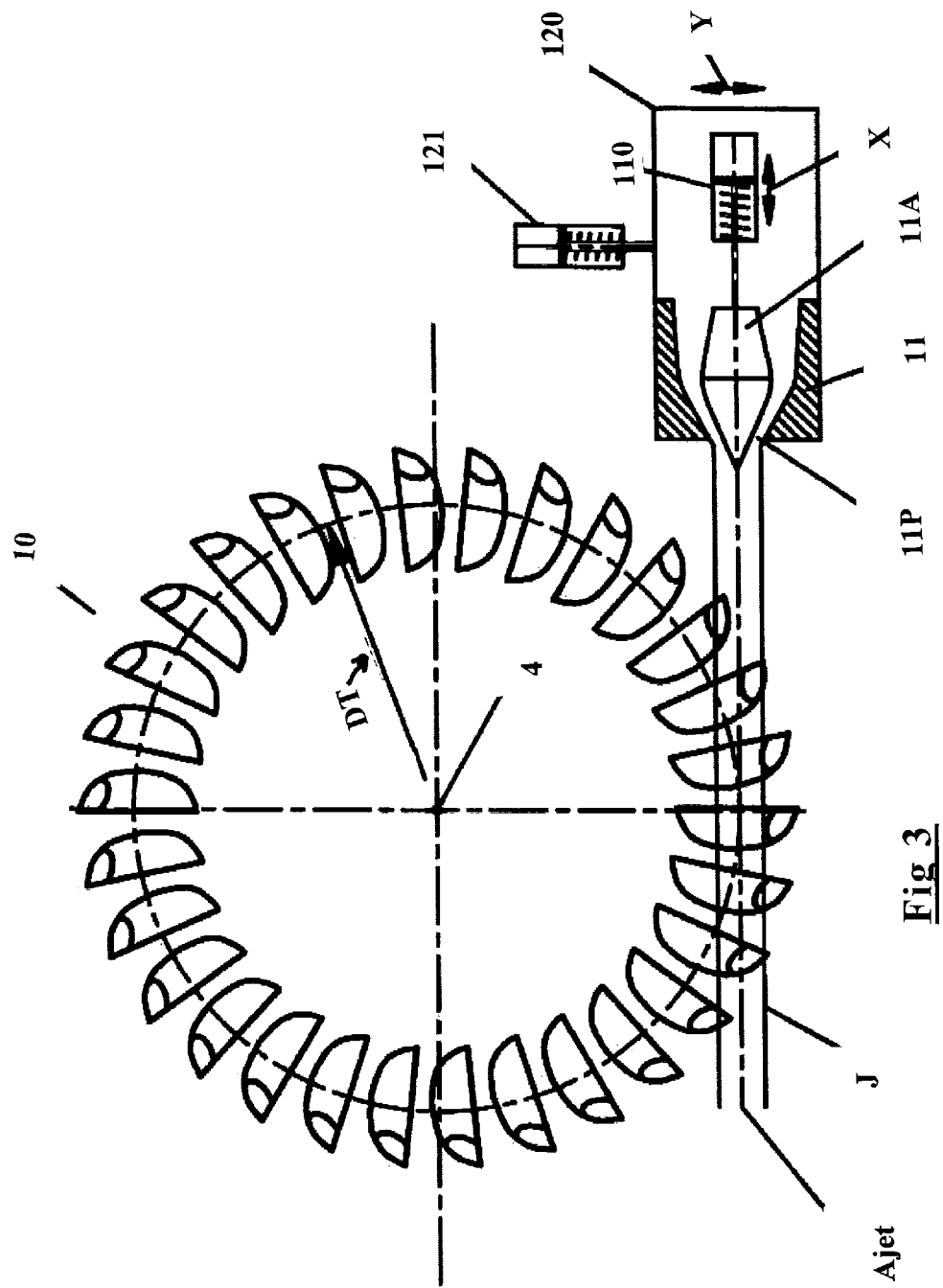

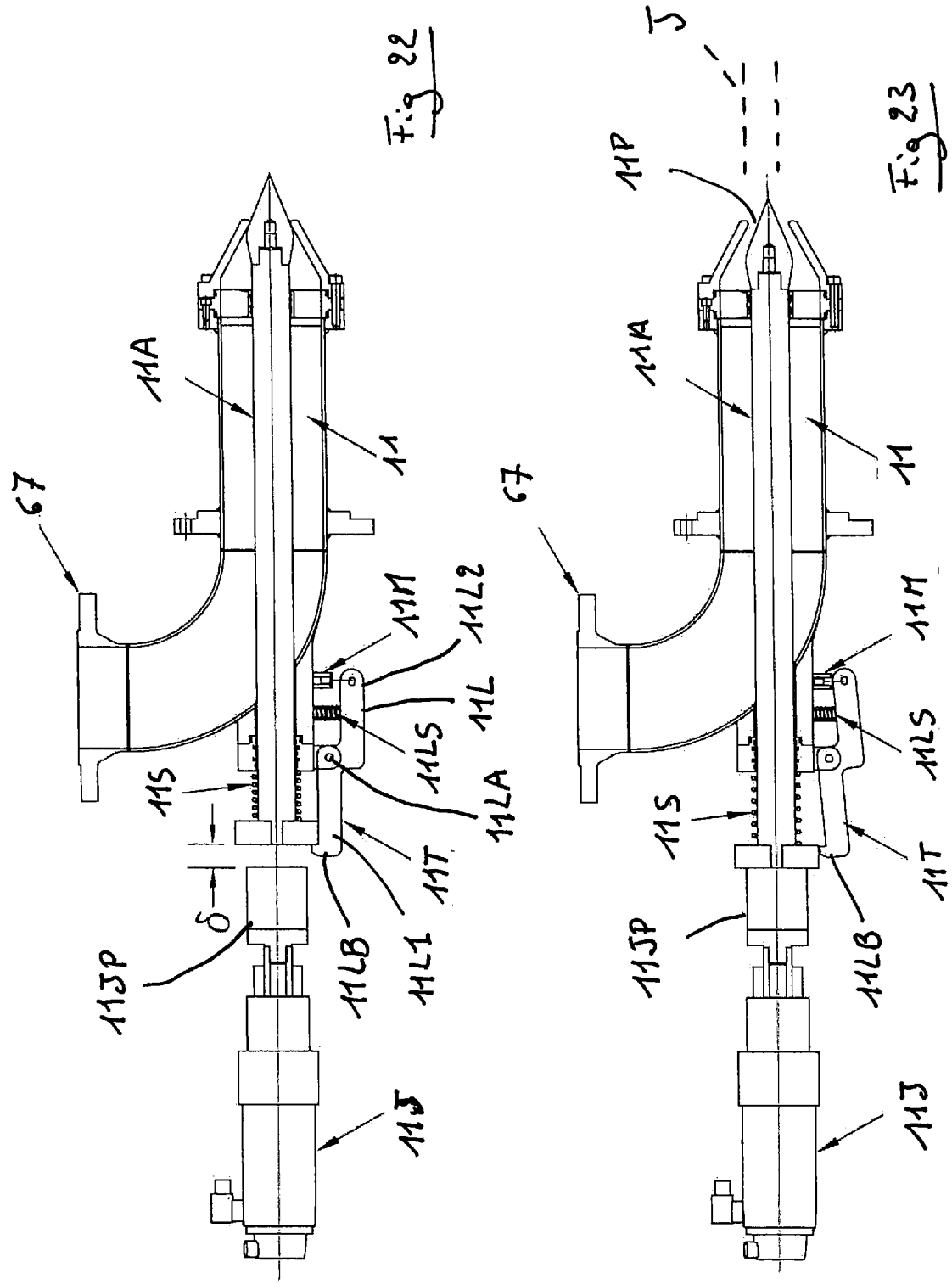

PELTON HYDRAULIC TURBINE AND INSTALLATION

The present application is a Continuation-in-Part of International application PCT/IB2022/051925 filed on Mar. 4, 2022 and published under number WO 2022/195393 on Sep. 22, 2022, and claiming the priority of Belgian patent application BE2021/0023 filed on Mar. 15, 2021.

THE STATE OF THE ART

Hydraulic turbines of the Pelton type are known.

The documents EP3321501 and 3184807 insist on the use of the Pelton turbine at constant pressure, to ensure a production as constant as possible of power with a desired frequency.

According to these documents, the pressure variations of the water projected on a Pelton turbine would not be favorable to its proper operation.

The article "Conception d'une turbine hydraulique de type Pelton à axe vertical" (Design of a hydraulic turbine of the Pelton type with vertical axis), Ir R Vermeulen et al, Gramme, Liège, Revue Scientifique des Ingénieurs Industriels, no 32, 2018, gives information on the possible dimensioning of a Pelton turbine, taking into consideration the water flow, the height of the waterfall, and the desired speed of rotation. Based on this theoretical information, as stated by the authors, "an encouraging Pelton turbine design for future development" is obtained. The authors admit that, despite this encouraging design, prototyping steps and trials will be required to arrive at an appropriate Pelton, thus confirming that theory and calculations do not provide assurance of obtaining a Pelton with the desired characteristics.

The authors of this article therefore confirm that the realization of a specific Pelton turbine cannot really be developed on paper, and that trials are necessary to try to find the most appropriate Pelton turbine model for a specific use.

The article "Pelton Turbine: Identifying the optimum number of buckets using CED", by A. Zidonis et al, Journal of Hydrodynamics, Ser. B; Volume 28: 1, February 2016, Pages 75-83 (accessible on the internet via the site: https://www.sciencedirect.eom/science/article/abs/pii/S 100160581660 6091) teaches that Pelton turbines were developed for more than 100 years, but that little work has been undertaken to determine the optimal number of buckets. The authors draw as conclusion of their study that the number of buckets is an important parameter, but that there is no valid teaching based on numerical or experimental research data.

This article does not teach, nor suggest the use of a variable flow rate injector with a passage outlet defining a variable outlet diameter at least between a first outlet diameter to provide a first flow rate of water issuing from the injector for a first hydraulic pressure corresponding to the maximum hydraulic pressure, and a second outlet diameter at least 20% greater than said first outlet diameter for a second hydraulic pressure at least 30% lower than the maximum hydraulic pressure. This article does not teach either a number of buckets from 19 to 33, nor buckets with half-shells each defining a cavity characterized by a maximum width (Lmax) measured perpendicular to the plane of symmetry comprised between 1.3 and 1.9 times said second outlet diameter of the injector, a maximum length (lmax) measured parallel to the plane of symmetry comprised between 2.2 and 3 times said second outlet diameter of the injector (11), and a maximum depth measured from the plane of the peripheral edge, parallel to the plane of symmetry comprised between 0.8 and 1.2 times said second injector outlet diameter.

There is no further mention in this article of buckets whose indentation or notch has two side edges with remote end parts distant from each other by a distance comprised between 1 and 1.2 times said second outlet diameter of the injector, and whose outer surface opposite to the cavities has a longitudinal channel located under the central rib, said longitudinal channel having a bottom at least part of which is located between a first longitudinal plane perpendicular to the plane of symmetry and passing by the points of the cavities located at the maximum depth, and a second longitudinal plane perpendicular to the plane of symmetry and intersecting the central rib, said second longitudinal plane being advantageously a plane intersecting the notch perpendicular to the plane of symmetry, or a plane perpendicular to the plane of symmetry tangent to the notch in the vicinity of its end closest to the bottom of the cavities.

A CAES (Compressed Air Energy Storage) energy storage project has emerged, in an attempt to respond to the storage of green energy by systems other than those using batteries (for example lithium based batteries). This CAES project involves storing excess green energy in the form of compressed air in very large underground reservoirs (several hundred thousand cubic meters), for example in the galleries of former salt mines. This compressed air is then used to supply a fuel combustion chamber or kerosene, the combustion gases then supplying a gas turbine (of the reaction turbine type). By using very large tanks, it is possible to ensure a substantially constant pressure of the air supplied to the inlet of the combustion chamber. Storing the excess of green energy in smaller volumes does not make it possible to maintain a constant pressure, which then does not make it possible to ensure a constant optimum yield for the reaction turbine.

This has been confirmed by tests carried out with energy storage systems in the form of compressed air in small volume tanks.

The article "Design and implementation of pumped-hydro-compressed-air energy storage System", R. Kumar et al, International Journal of Electrical Engineering & Emerging Technology, Vol 01, No. 01, December 2018, pages 1-6, teaches a system combining two techniques, namely PHES (Pumped-Hydro Energy Storage) and CAES (Compressed-Air Energy Storage). FIG. 6 of this article shows the energy delivered over a limited period of time (8 minutes), with energy production reduced by almost 40% after 6 minutes of use. This article therefore confirms the existence of a problem for the storage and restitution of energy stored in the form of compressed air in small reservoirs.

The "Design of Pelton turbines" presentation (accessible via the site: http://www.ivt.ntnu.no/ept/fag/tep4195/innhold/Forelesninger/forelesninger%2006/5%20-%20Pelton%20Turbine.pdf, accessed on December 2019) teaches different parameters that would influence the design of a Pelton turbine. According to this presentation, the Pelton turbine would be appropriate for the production of energy with heights of fall of more than 600 m and for powers of more than 100 MW.

As can be seen from the first figure in this presentation, many different types of water turbines exist.

Among the hydraulic turbines, we have the turbines with action which transform essentially all the potential energy of the water into a kinetic energy of the water which then acts on a wheel for its rotation, and the turbines with reaction for which the mass of water at low speed acts on the wheel of the turbine for its rotation. A reaction turbine is, for example, a Kaplan turbine powered by a very high flow of water (for example several tons per second).

The document FR-1018242 describes a Pelton-type turbine provided with means for guiding the water leaving the buckets after having completed its work. No reference is made to variable rate injectors with an outlet passage defining a variable outlet diameter.

Document US 2017/0045898 discloses injectors suitable for ensuring constant pressure.

Document U.S. Pat. No. 2,140,230 discloses a Pelton turbine with single blades without notch or indentation, operating with a water inlet system with a constant water jet diameter, All these documents provide information on possible modifications, which have always to be confirmed by tests in real conditions.

The number of parameters and the number of possible modifications make the task complicated for those skilled in the art to find the turbine ensuring optimum energy recovery, with an efficiency as constant as possible, by an alternator of a determined net nominal power from 5 to 1000 kW with a variable height of waterfall varying on large ranges, and whose determined maximum height of waterfall is comprised between 70 and 500 m, in particular between 150 m and 500 m, said height of waterfall decreasing during the water supply to the turbine. A person skilled in the art is therefore confronted with the problem of finding a turbine capable of ensuring stable electrical production even in the event of a drop in the pressure of the water supplied to the turbine.

BRIEF DESCRIPTION OF THE INVENTION

The subject of the invention is a turbine ensuring excellent yield of the turbine, even if the hydraulic pressure drops from $30 \times 10^5$ Pa to less than $15 \times 10^5$ Pa, or even less, such as for example at a pressure of 7 to $12 \times 10^5$ Pa or from $250 \times 10^5$ Pa to $200 \times 10^5$ Pa, or from $200 \times 10^5$ Pa to $150 \times 10^5$ Pa. The turbine according to the invention thus makes it possible to avoid problems linked to drop in hydraulic pressure, thus making the electrical production much more stable at maximum production regime, but also making it possible to adapt the electrical production regime, while ensuring average yield of the turbine greater than 88%, or even greater than 90% and more.

The turbine according to the invention is a hydraulic turbine of the Pelton type (1) adapted to drive an alternator (2) with a determined net rated (nominal) power of 5 to 1000 kW by at least one jet of water issuing from an injector (11) along a central axis of the jet (Ajet), said at least one jet of water having a jet diameter (djet) and a variable effective hydraulic pressure (Peff) lower than a maximum hydraulic pressure (PMax) equivalent to a determined waterfall height (HMax) of between 70 m and 500 m (for example between 150 m and 500 m). The turbine according to the invention is therefore a turbine suitable for driving a medium-power alternator, that is to say a turbine which is often supplied with water whose pressure varies significantly, for example whose pressure varies from $30 \times 10^5$ Pa to 10 to $12 \times 10^5$ Pa or whose height of waterfall varies from 300 m to about 100 m. The turbine according to the invention aims to respond to the problem of variation in hydraulic pressure or height of fall, variation disturbing the efficiency of a conventional Pelton turbine at the desired nominal power. The Pelton turbine of the invention can also be used in no break system, the Pelton turbine being then able for driving high powerful alternator for example for a short period of up to 2 to 5 minutes.

It has now been discovered that it is by using a combination of characteristics that it has been possible to ensure a turbine efficiency of more than 88%, and even more than 90% despite variations in waterfall height of 500 m to 100 m or variations in hydraulic pressure from 50 bar ($50 \times 10^5$ Pa) to 10 bar ($10 \times 10^5$ Pa), while avoiding unwanted shocks and vibrations at the level of the buckets, shocks and vibrations which can lead to problems of cavitation and destruction of the buckets, overheating problems. By avoiding these problems of cavitation, vibrations and destruction, it is possible to extend the periods of use and to space out the maintenance or repair operations.

This then enables to further increase the effective efficiency of the turbine according to the invention, since the periods of non-use for maintenance work are more spaced out in time and shorter (maintenance work requiring shorter interventions).

The invention relates to a turbine unit comprising a hydraulic turbine of the Pelton type (1) adapted to drive an alternator (2) with a determined net rated power of 5 to 1000 kW by at least one water jet (J) issuing from a water injector along a central axis of the water jet (Ajet), said at least one water jet (J) having a maximum size defined by a jet diameter (djet) and a variable effective hydraulic pressure (Peff) lower than a maximum effective hydraulic pressure (PMax) equivalent to a determined waterfall height (HMax) comprised between 70 and 500 m, in particular between 150 m and 500 m, in which the said hydraulic turbine (1) comprises at least:
- a body (10) of the turbine (1), said body (10) bearing a rotating shaft defining an axis of rotation (4);
- a wheel (3) with a periphery (30) of diameter (D) comprised between 300 mm and 2000 mm, advantageously between 300 mm and 1000 mm, said wheel (3) being mounted on the said rotating shaft, whereby the wheel is rotating relative to the turbine body (10) about the said axis of rotation (4);
- a series of buckets (5) mounted in a regular manner along the periphery (30) of the wheel (3), each bucket (5) having the shape of two half-shells (50,51) symmetrical with respect to a plane of symmetry (6), said half-shells (50,51) defining a peripheral edge (5A,5P) extending substantially in a plane (P5P), said half-shells (50,51) being bound to each other along a central rib (52) located in the plane of symmetry (6), each bucket (5) having a free end wall (53) remote from the periphery (30) of the wheel (3), said free end wall (53) being provided with a notch (54) whose size is greater than the maximum size of the water jet (J) of the injector (11), each half-shell (50,51) having a bottom (50A, 51A), while the notch (54) of a bucket (5) defines an opening (54) to each half-shell (50,51) of the bucket (5) in consideration; and
- at least one water injector (11) adapted to direct at least a water jet (J) successively towards at least one bucket of the series of buckets (5) of the wheel (3) for driving the wheel into rotation around the said axis of rotation (4), said at least one water injector (11) defining a passage outlet (11P) characterized by an outlet diameter (ds) corresponding substantially to the jet diameter (djet) of the water jet (J) leaving the injector (11), in which the said at least one water injector is arranged with respect to the buckets of the wheel (3) so that the central axis of the water jet (J) issuing from the said at least one injector (11) towards successively at least one bucket of the series of buckets (5) is tangent to a turbine circle (CT) having a centre located on the axis of rotation (4) of the wheel (3) and having a turbine diameter (DT) greater than the diameter (D) of the periphery (30) of the wheel (3).

The outlet diameter (ds) is advantageously determined by the flow continuity method, i.e.: in any water passage section in the injector, the instantaneous average water velocity in a passage section multiplied by the surface of said section is constant from one section to another.

For a given nominal (rated) power, the outlet diameter (and therefore the passage section) will vary according to the waterfall height (ΔH), according to a general formula:

$$(ds) = \pm (ds_1) \times ((\Delta H_1)^{0.75}/(\Delta H)^{0.75})$$

for ΔH between 70 and 500 m. For each injector, the outlet diameter is defined on the basis of these constructive characteristics, and its passage section, which varies according to the position of the needle. The variation in outlet diameter or passage section can be of the continuous or discontinuous type, for example in steps, for example with outlet diameters varying by jumps of 2 to 5 mm, for example with outlet diameters varying between a minimum from 3 to 60 mm and a maximum varying from 9 to 120 mm. Preferably, the variation in outlet diameter varies at most between a minimum diameter and a maximum diameter lower to three times the minimum diameter, in particular lower to 2.5 times the minimum diameter. The outlet diameter ds1 for a given injector is for example determined by calibration with a maximum water pressure. The movement of the needle of the injector is then calibrated to determine the passage section and the outlet diameter, as a function of the flow rate of water passing through the injector, with the water always supplied at constant pressure.

This then makes it possible to convert a diameter ds2 into a displacement of the needle with respect to its position for the outlet diameter ds1.

The turbine unit according to the invention is essentially characterized in that:
the said at least one water injector (11) is a variable flow rate injector with a variable passage outlet (11P) defining a variable outlet diameter (ds) able to vary at least between at least a first outlet diameter (ds1) to ensure a first flow rate of water leaving the variable flow rate injector (11) adapted for a first hydraulic pressure (P1) corresponding to the maximum hydraulic pressure (PMax), and a second outlet diameter (ds2) at least 20% (advantageously from 20 to 40%, such as 25% to 30%) greater than said first outlet diameter (ds1) adapted for a second hydraulic pressure (P2) at least 30% (for example from 30 to 75%, or even from 40 to 70%, such as 45%, 50%, or even from 60 to 66%) lower than the maximum hydraulic pressure (PMax).
the number of buckets (5) is from 19 to 33.
the half-shells (50,51) of each bucket (5) each define a cavity (50C, 51C) characterized by
(a) a maximum width (Lmax) measured perpendicular to the plane of symmetry (6) comprised between 1.3 and 1.9 times said second outlet diameter (ds2) of the variable flow rate injector (11),
(b) a maximum length (lmax) measured parallel to the plane of symmetry (6) comprised between 2.2 and 3 times said second outlet diameter (ds2) of the variable flow rate injector (11), and
(c) at least one deepest point (C50,C51) located at a maximum depth (Pmax) from the plane (P5P) of the peripheral edge (5A,5P) comprised between 0.8 and 1.2 times (advantageously from 1.05 to 1.15 times) said second outlet diameter (ds2) of the injector (11), said maximum depth (Pmax) being measured along a line parallel to the plane of symmetry (6) and perpendicular to the plane (P5P) of the peripheral edge (5A,5P).
the notch (54) of each bucket (5) has two lateral edges (54A, 54B) with remote end parts separated from each other by a distance (d54) comprised between 1 and 1.2 times (advantageously from 1.05 to 1.15 times) said second outlet diameter (ds2) of the variable flow rate injector (11), and
each bucket (5) has an outer face (5SE) opposite to the cavities (50C, 51C), said outer face (5SE) having a longitudinal channel (15) located under the central rib (52), said longitudinal channel (15) having a bottom with at least a part (15p) located between a first longitudinal plane (P1) perpendicular to the plane of symmetry (6) and extending through the deepest points (C50,C51) of the cavities (50C, 51C), and a second longitudinal plane (P2) perpendicular to the plane of symmetry (6) and intersecting the central rib (52). The second longitudinal plane P2 is for example the plane P5P in which extends the perimeter of the cavities (50,51) or another plane intersecting the central rib (52) perpendicular to the plane of symmetry (6), in particular a plane intersecting the notch (54) perpendicular to the plane of symmetry (6), or a plane perpendicular to the plane of symmetry (6) tangent to the notch (54) in the vicinity of its end closest to the bottom of the cavities (50, 51).

It is by using the combination of these characteristics that it has been possible to ensure a turbine efficiency of more than 90%, despite variations in the waterfall height from 300 m to 100 m or variations of hydraulic pressure from 30 bars ($30 \times 10^5$ Pa) to 10 bars ($10 \times 10^5$ Pa), while avoiding unwanted shocks and vibrations at the level of the blades or buckets, shocks and vibrations which can lead to cavitation problems and destruction of the blades or buckets.

The turbine according to the invention thus opens the field, at the local level, to the storage of green, solar and/or wind energy, or even excess electricity production, in the form of potential energy by putting water under compression in one or more tanks (e.g. pressure tanks).

In addition, it has been observed that by using the turbine according to the invention, a quantity of gas or air dissolved in the pressurized water is released from the water when leaving the injector and when contacting the water jet with the buckets, but when the jet bursts on the buckets, the water takes up a quantity of gas which is substantially equal to the quantity of gas released. This is particularly advantageous because it ensures a more or less constant dissolution of air or gas in the pressurized water.

Advantageously, the number of buckets is from 19 to 33, in particular odd number equal to 23 or 25 or 27 or 29 or 31 or 33, preferably odd number equal to 27 or 29 or 31 or 33.

Tests have shown that the use of an odd number of buckets ensured better stability in terms of yield, and ensured less vibration during rotation.

According to an advantageous embodiment, the turbine unit comprises one, two or three variable-flow injectors, preferably one single variable-flow injector.

According to advantageous details of embodiments of the turbine unit according to the invention, the turbine has one or more of the following characteristics:
the variable flow rate injector(s) of the at least one hydraulic turbine of the Pelton type is/are connected to a control device modifying the outlet diameter at least as a function of the variable effective hydraulic pressure, in order to ensure a flow rate of water successively towards at least one bucket (5) of the said series of buckets (5) selected from the group consisting of a water flow rate substantially equal to a predetermined water flow rate and a water flow rate comprised within a range of water flow rates varying between 0.9 and 1.1 times a predetermined water flow rate.

the variable flow rate injector or each variable flow rate injector is provided with a water jet axis modification means for modifying the central axis of the water jet issuing from the variable flow rate injector (11) substantially parallel to a predetermined axis, in particular substantially in the same plane perpendicular to the axis of rotation of the wheel. Advantageously, the central axis of the jet leaving the injector deviates from the axis of rotation of the wheel when the hydraulic pressure or waterfall height decreases. This modification preferably takes place so that the jet emerging from the injector is always parallel to a predetermined direction. The displacement of the central axis of the jet modifies, for example, the spacing of this axis relative to the axis of rotation of the wheel by a distance of between 1 mm and 50 mm. It has been noticed that even a small gap or spacing could have a non-negligible impact on performance, and/or on less cavitation or less vibration.

the water jet axis modification means is selected from the group consisting of:
  a variable passage outlet (11P) of the variable flow rate injector (11) varying at least between, on the one hand, a first passage outlet with a first outlet diameter (ds1) adapted for ensuring a first water jet issuing from the variable flow rate injector (11) with a first hydraulic pressure (P1) corresponding to the maximum hydraulic pressure (PMax), said first water jet leaving the variable flow rate injector (11) along a first jet axis (djet1) located at a first distance (dd1) from the axis of rotation (4) of the wheel (3), and, on the other hand, a second passage outlet with a second outlet diameter (ds2) which is at least 20% (advantageously from 20 to 40%) greater than said first outlet diameter (ds1), said second passage outlet being adapted for ensuring a second water jet issuing from the variable flow rate injector with a second hydraulic pressure (P2) which is at least 30% (advantageously from 30 to 75%) lower than the maximum hydraulic pressure (PMax), said second water jet leaving the variable flow rate injector along a second jet axis (djet2) substantially parallel to said first jet axis (djet1) and located at a second distance (dd2) from the axis of rotation (4) of the wheel (3), said second distance (dd2) being greater than said first distance (dd1),
  a movable support (120) relative to the turbine body (10), said movable support bearing the variable flow rate injector (11), whereby the movable support (120) is at least movable between a first support position adapted for ensuring a first water jet (J) leaving the variable flow rate injector (11) along a first jet axis (djet1) located at a first distance (dd1) from the axis of rotation (4) of the wheel (3), and a second support position adapted for ensuring a second water jet (J) leaving the variable flow rate injector (11) along a second jet axis (djet2) located at a second distance (dd2) from the axis of rotation (4) of the wheel (3) which is greater than the said first distance (dd1), whereby said second jet axis (djet2) is parallel to the first jet axis (djet1), and combination thereof.

the second distance (dd2) is advantageously at most 1.1 times the said first distance (dd1). The gap or spacing between the second distance (dd2) and the first distance (dd1) is less than 10%, advantageously less than 5% of said first distance (dd1). This spacing is for example 1%, 2%, 3%, 4% and 5% of the first distance. This small gap or spacing makes it possible to partially compensate a loss of pressure in the water supplied to the injector.

The turbine unit is advantageously provided with a controller for the variable flow rate injector(s) for modifying the variable outlet passage (11P) in function of a given hydraulic pressure comprised between the first hydraulic pressure (P1) and the second hydraulic pressure (P2), so that for said given hydraulic pressure, the variable outlet passage has an outlet diameter at least substantially function of the ratio of maximum hydraulic pressure to said given hydraulic pressure, to the power of ¾.

The turbine unit further comprises at least one sensor selected from the group consisting of a vibration sensor, a cavitation sensor, and a combination thereof, as well as at least one control device adapted for modifying the variable outlet diameter (ds) of the variable passage outlet (11) by following at least one pre-established curve selected from the group consisting curves pre-established based on turbine vibrations for at least one series of different water flow rates and for at least one series of different water pressures, curves pre-established based on turbine cavitations for at least one series of different water flow rates and for at least one series of different water pressures, curves pre-established based on turbine vibrations and turbine cavitations for at least one series of different water flow rates and for at least one series of different water pressures, and combination thereof, so as to adapt at least one variable element selected from the group consisting of a variable element modifying the variable passage outlet of the variable passage outlet (11P), a variable element of the water jet axis modification means, and combination thereof, so as to reduce at least one of the group consisting of cavitations and vibrations, while ensuring a turbine efficiency greater than 88%.

The control device adapts said second outlet diameter by following a curve or a set of curves pre-established to reduce the vibrations of the turbine or to reduce the effects of cavitation.

The pre-established curve or curves are in particular established by tests varying the outlet diameter (ds2) and/or the position of the injector, for variable waterfall heights or variable water pressure, these tests then measuring the turbine yield, the vibrations at the level of the rotating shaft of the turbine (for example measured by a temperature sensor to measure heating), and/or the effects of a possible cavitation (for example in the form of a noise sensor). Other vibration and/or cavitation sensors are possible.

According to the invention, the turbine comprises or is associated with a vibration sensor and/or a cavitation sensor, and with a control device adapting said second outlet diameter by following a curve or a set of curves pre-established on the basis of vibrations of the turbine or cavitation of the turbine for at least one series of different water flow rates and for at least one series of different water pressures, said control device adapting the outlet diameter (ds2) and/or the position of the injector, to reduce or avoid any cavitation and/or to reduce vibrations, while ensuring a turbine yield greater than 88%, in particular greater than 90%.

the variable flow rate injector or at least one variable flow rate injector or each variable flow rate injector of the at least one hydraulic turbine of the Pelton type is provided with a water jet axis modification means for modifying the central axis of the water jet issuing from the variable flow rate injector (11) substantially parallel to a predetermined axis, while the turbine is provided (a) with a water pressure sensor for determining a pressure parameter function of the variable effective hydraulic pressure of the said at least one water jet issuing from the variable flow rate injector, as well as (b) with a controller for the water jet axis modification means for adapting the position of the central axis of the water jet with respect to the axis of rotation (4) of the wheel (3) in function of the pressure parameter determined by the water pressure sensor.

The turbine unit is used for the production of electrical energy, advantageously for an immediate release of electrical energy. In this embodiment, the turbine unit advantageously further comprises:

at least one supply reservoir selected from the group consisting of supply tanks for storing water with a maximum hydraulic pressure of between $15 \times 10^5$ Pa and $250 \times 10^5$ Pa and supply basin with a maximum waterfall height of between 150 m and 500 m, at least one alternator with at least one driving shaft for driving into rotation a rotatable part of the alternator, at least one kinematic device connecting the rotating shaft of the turbine to the driving shaft of the alternator, and at least one pipe for bringing water from the said at least one supply reservoir to the said at least one water injector (11).

preferably, the turbine unit further comprises:

a collecting reservoir adapted to collect water from the at least one supply reservoir after said water has been directed towards successively at least one bucket of the wheel of the turbine, and a pumping device for bringing water back from the collecting reservoir to the at least one supply reservoir.

the turbine unit most preferably further comprises:

a collecting reservoir adapted to collect water from the at least one supply reservoir after said water has been directed towards successively at least one bucket of the wheel of the variable flow rate turbine, an electrical driven pumping device for bringing water back from the collecting reservoir to the at least one supply reservoir, and a device for supplying electric current to the electrical driven pumping device, said device for supplying electric energy being selected from the group consisting of photovoltaic panels and wind turbines.

The turbine unit is adapted for acting an electrical no break unit for supplying an electric consuming installation in case of electric supply break, i.e. is adapted for generating electrical power substantially immediately, such as in less than 100 ms, less than 50 ms, or even less (preferably a break of at most 30 ms, such as between and 30 ms, or even less). This is very helpful for ensuring no electrical break in data treating systems.

the at least one water injector (11) is associated to a controlled supply valve adapted to control at least the valve passage at least between a first valve passage adapted for enabling a first water flow rate into the at least one water injector (11) for a considered variable effective hydraulic pressure, and a second valve passage adapted for enabling a second water flow rate into the said at least one water injector for the said considered variable effective pressure, whereby said second water flow is at least lower than 50% of the said first water flow rate, whereby said controlled supply valve is associated to a trigger control element for enabling the passage of the controlled supply valve from its second valve passage to its first valve passage in less than 100 milliseconds, such as less than 50 ms, less than 25 ms.

Advantageously, the trigger control element is selected from the group consisting of magnetic trigger control element and electromagnetic trigger control element, said trigger control element being adapted for enabling the passage of the controlled supply valve from its second valve passage to its first valve passage in less than 50 milliseconds.

Preferably, the turbine unit further comprises a flywheel mounted on the said rotating shaft of the wheel (3). In this way, the wheel with the buckets to be contacted or contacted with the water jet is already driven into rotation by the flywheel, meaning that the water jet with the substantially fully open valve acts immediately for restoring the full speed of the flywheel and the adequate generation of electrical power. When already driven into rotation, the wheel with the buckets can act as flywheel or as an additional flywheel.

advantageously, the first valve passage is pre-established in function of the nominal network power. The position of the first valve passage can be variable in function of the instantaneous power consumption.

The turbine unit comprises (a) at least one water tank adapted for containing water at a pressure higher than $50 \times 10^5$ Pa, (b) an alternator mechanically coupled to the said rotating shaft of the wheel (3) of the Pelton turbine, (c) a flywheel mechanically coupled to the alternator and to the said rotating shaft of the wheel (3), (d) at least one piping system for supplying water from the water tank to the controlled supply valve, whereby the said at least one water tank is adapted for containing a volume of water with a pressure higher than $50 \times 10^5$ Pa (such as higher than $100 \times 10^5$ Pa, or even more, such as 200 to $300 \times 10^5$ Pa) for driving into rotation the Pelton turbine for at least 20 seconds (such as 30 to 60 seconds, or possibly more), whereby driving into rotation the alternator for generating for at least 20 seconds the nominal network power for supplying the electric consuming installation, and (e) an emergency engine adapted for producing the nominal network power for supplying the electric consuming installation, by driving into rotation the alternator, when the alternator is no more driven into rotation by the rotation of the Pelton turbine due to the water jet issued from said at least one injector.

combinations of two or more of these characteristics.

Another object of the invention is a hydraulic turbine of the Pelton type (1) adapted to drive an alternator (2) with a determined net nominal (rated) power from 5 to 1000 kW by at least one water jet emerging from an injector along a central jet axis (Ajet), said at least one water jet having a jet diameter (djet) and a variable effective hydraulic pressure (Peff) lower than a maximum hydraulic pressure (PMax)

equivalent to a determined waterfall height (HMax) between 150 m and 500 m, said turbine comprising at least:
   a turbine body (10),
   a wheel (3) with a periphery (30) of diameter (D) greater than 300 mm, advantageously less than 1000 mm, said wheel (3) being mounted for rotation relative to the turbine body (10) about an axis of rotation (4);
   a series of buckets (5) mounted in a regular manner along the periphery (30) of the wheel (3), each bucket (5) having the shape of two half-shells (50,51) symmetrical with respect to a plane of symmetry (6), said half-shells (50,51) defining a peripheral edge (5P) extending substantially in a plane, said half-shells (50,51) being interconnected along a central rib (52) located in the plane of symmetry (6), each bucket (5) having a free end wall (53) remote from the periphery (30) of the wheel (3), said free end wall (53) being provided with a notch (54) whose size is greater than that of the diameter of the jet (djet) of the injector, each half-shell (50,51) having a bottom (50A, 51A), while the notch (54) of a bucket (5) defines an opening (54) of each half-shell (50, 51) of the considered bucket (5);
   at least one injector (11) with an outlet passage (11P) characterized by an outlet diameter (ds) which corresponds substantially to the diameter of the jet (djet) of water leaving the injector (11), said injector (11) being arranged to direct the jet of water successively towards one or more buckets (5) of the wheel (3) for its rotation around the axis of rotation (4), in such a way that the central axis of said jet emerging from the injector (11) defines a tangent to a turbine circle (CT) whose center is located on the axis of rotation (4) of the wheel (3), said turbine circle (CT) being characterized by a turbine diameter (DT) greater than the diameter (D) of the periphery (30),
      in which the variable rate injector(s) is/are adapted to modify the central axis of the jet substantially parallel to an axis determined, in particular substantially in the same plane perpendicular to the axis of rotation of the wheel.

Advantageously, the central axis of the jet leaving the injector deviates from the axis of rotation of the wheel when the hydraulic pressure or the waterfall height decreases. This modification preferably takes place so that the jet emerging from the injector is always parallel to a predetermined direction. The displacement of the central axis of the jet modifies, for example, the spacing of this axis relative to the axis of rotation of the wheel by a distance of between 1 mm and 50 mm.

Advantageously, the injector (11) is a variable flow rate injector with a variable passage outlet (11P) defining (a) a variable outlet diameter (ds) as a function of the effective hydraulic pressure (Peff) and (b) a central variable jet axis substantially parallel to a given axis, said variable outlet diameter (ds) and said central variable jet axis varying at least between, on the one hand, a first outlet diameter (ds1) to ensure a first flow rate of water leaving the injector (11) for a first hydraulic pressure (P1) corresponding to the maximum hydraulic pressure (PMax), said first flow rate of water leaving the injector (11) along a first jet axis (djet1) located at a first distance (dd1) from the axis of rotation (4) of the wheel (3), and, on the other hand, a second outlet diameter (ds2) at least 20% (for example from 20 to 40%) greater than said first outlet diameter (ds1) for a second hydraulic pressure (P2) at least 30% (for example from 30 to 75%) lower than the maximum hydraulic pressure (PMax), said second outlet diameter (ds2) providing a second flow of water leaving the injector (11) along a second jet axis (djet2) substantially parallel to said first jet axis (djet1) and located at a second distance (dd2) of the axis of rotation (4) of the wheel (3), said second distance (dd2) being greater than said first distance (dd1).

Preferably, the gap or spacing between the second distance (dd2) and the first distance (dd1) is less than 10%, advantageously less than 5% of said first distance (dd1). This spacing is for example 1%, 2%, 3%, 4% and 5% of the first distance. This small spacing makes it possible to partially compensate for a loss of pressure in the water supplied to the injector.

A turbine having a variable flow rate injector constitutes a second object of the invention, said turbine having advantageously one or more of the characteristics of the turbine unit described as the first object according to the invention.

The invention also relates to an installation for the production of electrical energy comprising at least one basin or reservoir for storing water with a maximum hydraulic pressure of between $7\times10^5$ Pa and $250\times10^5$ Pa (advantageously between $15\times10^5$ Pa and $50\times10^5$ Pa—in case of a no break use, pressure between $100\times10^5$ Pa and $250\times10^5$ Pa are preferred) or with a maximum waterfall height of between 70 m and 500 m (advantageously between 150 and 500 m), at least one turbine according to the first object of the invention or according to the second object according to the invention, at least one alternator, at least one kinematic device connecting the shaft of the turbine to a drive shaft of the alternator, and at least one pipe for bringing the water from the basin or reservoir to the injector(s) of the turbine. The installation is thus, for example, suitable for operating between a given maximum pressure or a given maximum waterfall height, and a minimum pressure equal to less than 50%, or even less than 30% of the maximum pressure or a minimum waterfall height equal to less than 50% or even less than 30% of the maximum waterfall height.

Advantageously, said installation further comprises a collecting basin for collecting water from a storage basin or reservoir after its action on the wheel of the turbine, and a pumping device for bringing water back from the collecting basin to the storage basin or to the pressurized water tank. The tanks intended to contain water under pressure are for example cylindrical tanks, for example with a diameter of 1 m to 3 m, in particular in the form of a series of cylindrical tanks connected to each other, advantageously two by two or more, so that water from one tank is able to flow by gravity into the volume of another tank. Two tanks connected to each other are connected by a system (for example a pipe) ensuring that each tank comprises at least one zone filled with gas (in particular air), and advantageously a system ensuring that each tank during its emptying operation of water includes an zone containing a minimum of water. These zones of gas or air form buffer zones for the pressure during water filling operation in the tanks, while the minimum water zones of the tanks form zones improving a passage of gas (air or oxygen from the air) into/out of the water present in the zones, during water transfer operation to the injector(s). These zones of minimum water content also form a protection system for the injectors, since they thus prevent the transfer of any deposits to the injectors, which could cause problems of clogging of the latter or these.

Preferably, said installation is also associated with a device for supplying electric current from photovoltaic panels and/or wind turbines.

Another subject of the invention is a method for producing electrical energy, and advantageously also for storing potential energy for the production of electrical energy, in which a turbine unit according to the invention is used to convert the potential energy of water such as water contained in the basin or storage tank (in particular in tanks containing pressurized water) into electrical energy. This method makes it possible to ensure production close to the desired nominal or rated power, despite significant pressure variations for the water supplied to the injector or injectors.

The method of the invention is a method for producing electrical energy from potential energy contained water supplied from at least one supply reservoir selected from the group consisting of supply tanks for storing water with a maximum hydraulic pressure of between $7 \times 10^5$ Pa and $250 \times 10^5$ Pa (advantageously between $15 \times 10^5$ Pa and $50 \times 10^5$ Pa) and supply basins with a maximum waterfall height of between 70 m and 500 m (advantageously between 150 and 500 m), whereby said method uses a turbine unit of the invention as disclosed here above, said turbine unit having advantageously one or more of the above disclosed characteristics, in which said method comprises at least the following steps:

supplying water from the at least one supply reservoir to the said at least one water injector via the at least one pipe;

directing at least a water jet (J) from the at least one water injector (11) successively towards at least one bucket of the series of buckets of the wheel (3), so as to drive the wheel into rotation around the axis of rotation (4), while driving into rotation the rotatable part of the alternator via the at least one kinematic device; and producing electrical energy by rotating the rotatable part of the alternator.

Advantageous embodiments of the method of the invention comprise one or more of the following characteristics:

the turbine unit further comprises:

a collecting reservoir adapted to collect water from the at least one supply reservoir after said water has been directed towards successively at least one bucket of the wheel of the variable flow rate turbine, and a pumping device for bringing water back from the collecting reservoir to the at least one supply reservoir, whereby said method further comprises the following steps:

collecting water from the at least one water jet directed successively towards at least one bucket of the series of buckets of the wheel (3) of the variable flow rate turbine into the collecting reservoir, and pumping via the pumping device, water from the collecting reservoir for bringing water back to the at least one supply reservoir, for storing said water as potential energy in the at least one supply reservoir.

the turbine unit further comprises:

an electric supply device for supplying electric current to the electrical driven pumping device, said electric supply device for supplying electric energy being selected from the group consisting of photovoltaic panels and wind turbines, whereby said method further comprises the steps of:

producing electric energy from the electric supply device;

conducting at least a portion of said electric energy produced from the electric supply device to the pumping device for pumping water at least from the collecting reservoir and for bringing water back to the at least one supply reservoir, for storing said water as potential energy in the at least one supply reservoir.

The method for producing electrical energy from variable potential energy contained in water supplied from at least one supply reservoir, whereby said variable potential energy is able to incur at least one potential energy drop selected from the group consisting of (a) a drop height comprised between 20 m and 300 m for supply basins with a maximum waterfall height of between 70 m and 500 m, and (b) a hydraulic pressure drop comprised between $2 \times 10^5$ Pa and $30 \times 10^5$ Pa for supply tanks storing water with a maximum hydraulic pressure of between $7 \times 10^5$ Pa and $250 \times 10^5$ Pa, in which the step of directing at least a water jet (J) from the at least one water injector (11) successively towards at least one bucket of the series of buckets of the wheel (3) is controlled for adapting the flow rate of water directed successively towards at least one bucket of the series of buckets of the wheel (3), so as to ensure a turbine efficiency of at least 88% for the said at least one variable flow rate turbine, despite the at least one potential energy drop.

The method for producing electrical energy from variable potential energy contained in water supplied from at least one supply reservoir, whereby said variable potential energy is able to incur at least one potential energy drop selected from the group consisting of (a) a drop height comprised between 20 m and 300 m for supply basins with a maximum waterfall height of between 70 m and 500 m, and (b) a hydraulic pressure drop comprised between $2 \times 10^5$ Pa and $30 \times 10^5$ Pa for supply tanks storing water with a maximum hydraulic pressure of between $7 \times 10^5$ Pa and $250 \times 10^5$ Pa, in which the step of directing at least a water jet (J) from the at least one water injector (11) successively towards at least one bucket of the series of buckets of the wheel (3) is controlled for adapting the flow rate of water directed successively towards at least one bucket of the series of buckets of the wheel (3), so as to ensure a turbine efficiency of at least 90% for the said at least one variable flow rate turbine, despite the at least one potential energy drop.

The at least one hydraulic turbine of the Pelton type (1) has a number of buckets selected from odd numbers of the group consisting of 23, 25, 27, 29, 31 and 33, in particular 27, 29, 31 and 33.

the at least one water injector (11) is selected from the group consisting of one single water injector being a variable flow rate injector for directing one water jet successively towards at least one bucket (5) of the series of buckets of the wheel (3), two water injectors being a first variable flow rate injector directing a first water jet successively towards at least one bucket (5) of the series of buckets of the wheel (3), and a second variable flow rate injector directing a second water jet successively towards at least one bucket (5) of the series of buckets of the wheel (3), whereby the first water jet and the second water jet are distant from each other, and three water injectors being a first variable flow rate injector directing a first water jet successively towards at least one bucket (5) of the series of buckets of the wheel (3), a second variable flow rate injector directing a second water jet successively towards at least one bucket (5) of the series of buckets of the wheel (3), and a third variable flow rate injector directing a third water jet successively towards at least one bucket (5) of the series of buckets of the wheel (3) whereby the first water jet, the second water jet and the third water jet are distant from each other.

the variable flow rate injector (11) is connected to a control device modifying the variable outlet diameter (ds) at least as a function of the variable effective hydraulic pressure (Peff), in order to ensure a flow rate of water directed successively towards at least one bucket (5) of the said series of buckets (5) selected from the group consisting of a water flow rate substantially equal to a predetermined water flow rate and a water flow rate comprised within a range of water flow rates varying between 0.9 and 1.1 times a predetermined water flow rate, said method comprising at least the following steps:

determining the variable effective hydraulic pressure, determining an adapted outlet diameter at least as a function of the variable effective hydraulic pressure (Peff), in order to ensure a flow rate of water directed successively towards at least one bucket (5) of the said series of buckets (5) selected from the group consisting of a water flow rate substantially equal to a predetermined water flow rate and a water flow rate comprised within a range of water flow rates varying between 0.9 and 1.1 times a predetermined water flow rate, and adapting the variable outlet diameter (ds) to the determined adapted outlet diameter.

the variable flow rate injector (11) is provided with a water jet axis modification means for modifying the central axis of the water jet issuing from the variable flow rate injector (11) substantially parallel to a predetermined axis, as at least as a function of the variable effective hydraulic pressure (Peff) in order to ensure a turbine efficiency of more than 88%, said method comprising at least the following steps:

determining the variable effective pressure, determining an adapted central axis of the water jet issuing from the variable flow rate injector so as to ensure a turbine efficiency of more than 88%, and controlling the water jet axis modification means to adapt the central axis of the water jet of the variable flow rate injector to the determined adapted central axis.

the water jet axis modification means is selected from the group consisting of:

a variable passage outlet (11P) of the variable flow rate injector (11) varying at least between, on the one hand, a first passage outlet with a first outlet diameter (ds1) adapted for ensuring a first water jet issuing from the variable flow rate injector (11) with a first hydraulic pressure (P1) corresponding to the maximum hydraulic pressure (PMax), said first water jet leaving the variable flow rate injector (11) along a first jet axis (djet1) located at a first distance (dd1) from the axis of rotation (4) of the wheel (3), and, on the other hand, a second passage outlet with a second outlet diameter (ds2) which is at least 20% greater than said first outlet diameter (ds1), said second passage outlet being adapted for ensuring a second water jet issuing from the variable flow rate injector with a second hydraulic pressure (P2) which is at least 30% lower than the maximum hydraulic pressure (PMax), said second water jet leaving the variable flow rate injector along a second jet axis (djet2) substantially parallel to said first jet axis (djet1) and located at a second distance (dd2) from the axis of rotation (4) of the wheel (3), said second distance (dd2) being greater than said first distance (dd1), a movable support (120) relative to the turbine body (10), said movable support bearing the variable flow rate injector (11), whereby the movable support (120) is at least movable between a first support position adapted for ensuring a first water jet (J) leaving the variable flow rate injector (11) along a first jet axis (djet1) located at a first distance (dd1) from the axis of rotation (4) of the wheel (3), and a second support position adapted for ensuring a second water jet (J) leaving the variable flow rate injector (11) along a second jet axis (djet2) located at a second distance (dd2) from the axis of rotation (4) of the wheel (3) which is greater than the said first distance (dd1), whereby said second jet axis (djet2) is parallel to the first jet axis (djet1), and combination thereof.

Advantageously, the second distance (dd2) is at most 1.1 times the said first distance (dd1), whereby the step of determining an adapted central axis of the water jet issuing from the variable flow rate injector so as to ensure a turbine efficiency of more than 88% is preferably a step determining an adapted central axis located at a distance from the axis of rotation (4) of the wheel comprised between the first distance (dd1) and the second distance (dd2).

the turbine unit is provided with a controller for the variable flow rate injector for modifying the variable outlet passage (11P) in function of a given hydraulic pressure comprised between the first hydraulic pressure (P1) and the second hydraulic pressure (P2), so that for said given hydraulic pressure, the variable outlet passage has an outlet diameter at least substantially function of the ratio of maximum hydraulic pressure to said given hydraulic pressure, to the power of ¾, said method comprising the steps of:

determining the variable effective hydraulic pressure of the water jet (J), determining an adapted outlet diameter for the variable outlet passage at least as substantially function of the ratio of maximum hydraulic pressure to said determined variable effective hydraulic pressure, to the power of ¾, and adapting the variable outlet passage (11P) to the determined adapted outlet diameter.

the turbine unit further comprises at least one sensor selected from the group consisting of a vibration sensor, a cavitation sensor, and a combination thereof, as well as at least one control device adapted for modifying the variable outlet diameter (ds) of the variable passage outlet (11) by following at least one pre-established curve selected from the group consisting curves pre-established based on turbine vibrations for at least one series of different water flow rates and for at least one series of different water pressures, curves pre-established based on turbine cavitations for at least one series of different water flow rates and for at least one series of different water pressures, curves pre-established based on turbine vibrations and turbine cavitations for at least one series of different water flow rates and for at least one series of different water pressures, and combination thereof, so as to adapt at least one variable element selected from the group consisting of a variable element modifying the variable passage outlet of the variable passage outlet (11P), a variable element of the water jet axis modification means, and combination thereof, so as to reduce at least one of the group consisting of cavitations and vibrations, while ensuring a turbine efficiency greater than 88%, said method comprising at least the following steps:
determining a sensor parameter selected from the group consisting vibration parameter, cavitation parameter and combinations thereof from the said at least one sensor, determining the variable effective pressure of the water jet (J), determining at least partly from the said at least one pre-established curve, at least one determined variable element selected from the group consisting of a determined variable element modifying the variable passage outlet of the variable passage outlet (11P), a determined variable element of the water jet axis modification means, and combination thereof, so as to reduce at least one of the group consisting of cavitations and vibrations, while ensuring a turbine efficiency greater than 88%, and adapting the variable element to the determined variable element.

the at least one water injector (11) is associated to a controlled supply valve adapted to control at least the valve passage at least between a first valve passage adapted for enabling a first water flow rate into the at least one water injector (11) for a considered variable effective hydraulic pressure, and a second valve passage adapted for enabling a second water flow rate into the said at least one water injector for the said considered variable effective pressure, whereby said second water flow is at least lower than 50% of the said first water flow rate, whereby said controlled supply valve is associated to a trigger control element for enabling the passage of the controlled supply valve from its second valve passage to its first valve passage in less than 100 milliseconds, advantageously in less than 50 milliseconds, said method comprising the following steps:
receiving an electric supply defect information from an electric supply unit supplying an electric consuming installation, said electric supply defect information being selected from the group consisting of electric break from the electric supply unit and electric shortage from the electric supply;

activating the trigger control element for adapting the valve passage of the controlled supply valve from its second valve passage to its first valve passage in less than 100 milliseconds, advantageously in less than 50 milliseconds;

supplying the at least one water injector (11) with a first flow rate for generating a water jet at least towards one bucket of the series of buckets of the wheel (3), whereby driving into rotation the rotatable part of the alternator and generating electricity at least for supplying the electric consuming installation.

Preferably, the turbine unit further comprises a flywheel mounted on the said rotating shaft of the wheel (3), while said method comprises at least the following steps:
maintaining the flywheel and the wheel (3) in rotation at an appropriate rotation speed;

in case of receipt of the electric supply defect information, supplying water to the at least one water injector (11), for driving into rotation the rotatable part of the alternator and generating electricity, while ensuring the flywheel and the wheel to further rotate around the axis of rotation (4) at a speed substantially equal to the appropriate speed.

the turbine unit is operated as an electric no break unit.
combinations of two or more of said characteristics of the method of the invention.

Still another object of the invention is a bucket wheel assembly suitable for a turbine unit of the invention as disclosed above and comprising a hydraulic turbine of the Pelton type (1) adapted to drive an alternator (2) with a determined net rated power of 5 to 1000 kW by at least one water jet (J) issuing from a water injector along a central axis of the water jet (Ajet), said at least one water jet (J) having a maximum size defined by a jet diameter (djet) and a variable effective hydraulic pressure (Peff) lower than a maximum effective hydraulic pressure (PMax) equivalent to a determined waterfall height (HMax) comprised between 70 and 500 m, in particular between 150 m and 500 m, in which the said hydraulic turbine (1) comprises at least:

a body (10) of the turbine (1), said body (10) bearing a rotating shaft defining an axis of rotation (4);

a wheel (3) with a periphery (30) of diameter (D) comprised between 300 mm and 2000 mm, advantageously comprised between 300 mm and 1000 mm, for example comprised between 400 and 750 mm, such as 450 mm, 500 mm, 550 mm and 600 mm, said wheel (3) being mounted on the said rotating shaft whereby the wheel is rotating relative to the turbine body (10) about the said axis of rotation (4);

a series of buckets (5) mounted in a regular manner along the periphery (30) of the wheel (3), each bucket (5) having the shape of two half-shells (50,51) symmetrical with respect to a plane of symmetry (6), said half-shells (50,51) defining a peripheral edge (5A,5P) extending substantially in a plane (P5P), said half-shells (50,51) being bound to each other along a central rib (52) located in the plane of symmetry (6), each bucket (5) having a free end wall (53) remote from the periphery (30) of the wheel (3), said free end wall (53) being provided with a notch (54) whose size is greater than the maximum size of the water jet (J) of the injector (11), each half-shell (50,51) having a bottom (50A, 51A), while the notch (54) of a bucket (5) defines an opening (54) to each half-shell (50,51) of the bucket (5) in consideration;

at least one water injector (11) adapted to direct at least a water jet (J) successively towards at least one bucket of the series of buckets (5) of the wheel (3) for driving the wheel into rotation around the said axis of rotation (4), said at least one water injector (11) defining a passage outlet (11P) characterized by an outlet diameter (ds) corresponding substantially to the jet diameter (djet) of the water jet (J) leaving the injector (11), in which the said at least one water injector is arranged with respect to the buckets of the wheel (3) so that the central axis of the water jet (J) issuing from the said at least one injector (11) towards successively at least one bucket of the series of buckets (5) is tangent to a turbine circle (CT) having a centre located on the axis of rotation (4) of the wheel (3) and having a turbine diameter (DT) greater than the diameter (D) of the periphery (30) of the wheel (3), in which the said at least one water injector (11) is a variable flow rate injector with a variable passage outlet (11P) defining a variable outlet diameter (ds) able to vary at least between at least a first outlet diameter (ds1) to ensure a first flow rate of water leaving the variable flow rate injector (11) adapted for a first hydraulic pressure (P1) corresponding to the maximum hydraulic pressure (PMax), and a second outlet diameter (ds2) at least 20% greater than said first outlet diameter (ds1) adapted for a second hydraulic pressure (P2) at least 30% lower than the maximum hydraulic pressure (PMax), in which the number of buckets is comprised between 19 and 33, advantageously selected from odd numbers of the group consisting of 19, 21, 23, 25, 27, 29, 31 and 33, (preferably of the group consisting of 23, 25, 27, 29, 31 and 33, and most preferably of the group consisting of 27, 29, 31 and 33), in which the half-shells (50,51) of each bucket (5) each define a cavity (50C, 51C) characterized by:

(a) a maximum width (Lmax) measured perpendicular to the plane of symmetry (6) comprised between 1.3 and 1.9 times said second outlet diameter (ds2) of the variable flow rate injector (11), (b) a maximum length (lmax) measured parallel to the plane of symmetry (6) comprised between 2.2 and 3 times said second outlet diameter (ds2) of the variable flow rate injector (11), and (c) at least one deepest point (C50,C51) located at a maximum depth (Pmax) from the plane (P5P) of the peripheral edge (5A,5P) comprised between 0.8 and 1.2 times (advantageously between 1.05 and 1.15 times) said second outlet diameter (ds2) of the injector (11), said maximum depth (Pmax) being measured along a line parallel to the plane of symmetry (6) and perpendicular to the plane (P5P) of the peripheral edge (5A,5P), in which the notch (54) of each bucket (5) has two lateral edges (54A, 54B) with remote end parts separated from each other by a distance (d54) comprised between 1 and 1.2 times said second outlet diameter (ds2) of the variable flow rate injector (11), and in which each bucket (5) has an outer face (5SE) opposite to the cavities (50C, 51C), said outer face (5SE) having a longitudinal channel (15) located under the central rib (52), said longitudinal channel (15) having a bottom with at least a part (15p) located between a first longitudinal plane (P1) perpendicular to the plane of symmetry (6) and extending through the deepest points (C50,C51) of the cavities (50C, 51C), and a second longitudinal plane (P2) perpendicular to the plane of symmetry (6) and intersecting the central rib (52).

The bucket assembly of the invention comprises a wheel (3) having a periphery (30) of diameter (D) comprised between 300 mm and 2000 mm, advantageously between 300 mm and 1000 mm, for example comprised between 400 and 750 mm, such as 450 mm, 500 mm, 550 mm and 600 mm, said wheel (3) being mounted or able to be mounted on a central shaft defining the axis of rotation (4). The bucket assembly of the invention is further characterized in that:

a series of buckets (5) are mounted in a regular manner along the periphery (30) of the wheel (3), each bucket (5) having the shape of two half-shells (50,51) symmetrical with respect to a plane of symmetry (6), said half-shells (50,51) defining a peripheral edge (5P) extending substantially in a plane, said half-shells (50,51) being interconnected along a central rib (52) located in the plane of symmetry (6), each bucket (5) having a free end wall (53) remote from the periphery (30) of the wheel (3), said free end wall (53) being provided with a notch (54) whose size is greater than that of the jet diameter (djet) of the injector, each half-shell (50, 51) having a bottom (50A, 51A), while the notch (54) of a bucket (5) defines an opening (54) of each half-shell (50,51) of the bucket considered (5);

the number of buckets is comprised between 19 and 33, advantageously selected from odd numbers of the group consisting of 19, 21, 23, 25, 27, 29, 31 and 33, (preferably of the group consisting of 23, 25, 27, 29, 31 and 33, and most preferably of the group consisting of 27, 29, 31 and 33), the notch (54) of each bucket (5) has two lateral edges (54A, 54B) with remote end parts separated from each other by a distance (d54) of between 1 and 1.2 times said second outlet diameter (ds2) of the injector (11), and each bucket (5) has an outer surface (5SE) opposite to the cavities (C50, C51) having a longitudinal channel (15) located under the central rib (52), said longitudinal channel (15) having a bottom of which at least a part (15p) is located between a first longitudinal plane (P1) perpendicular to the plane of symmetry (6) and extending through the points of the cavities (C50, C51) located at the maximum depth (Pmax), and a second longitudinal plane (P2) perpendicular to the plane of symmetry (6) and intersecting the central rib (52), said second longitudinal plane (P2).

Features and details of advantageous embodiments of the invention will become apparent from the following description in which reference is made to the attached drawings.

BRIEF DESCRIPTION OF THE DRAWINGS

In the attached drawings,

FIG. 1 is a schematic view of a Pelton turbine wheel of the known type (CLASSIC PELTON), associated with an injector, while

FIG. 2 is a view of a Pelton turbine according to the invention (also referred as PELTON RUTTEN in the description) associated with a variable flow rate injector, while

FIG. 3 is a view of the turbine unit according to FIG. 2, with a variable flow rate injector mounted for displacement;

FIG. 20 is a schematic view of a turbine unit of the invention associated to an alternator and to a flywheel, while

FIG. 22 is a cross sectional view of an injector adapted to be used with a turbine of the invention for a no break system, said injector being in a closed position, and FIG. 23 is a view of the injector of FIG. 22 in an open position for directing a water jet towards the buckets of the Pelton turbine.

DESCRIPTION OF PREFERRED EMBODIMENTS

Figure 1:
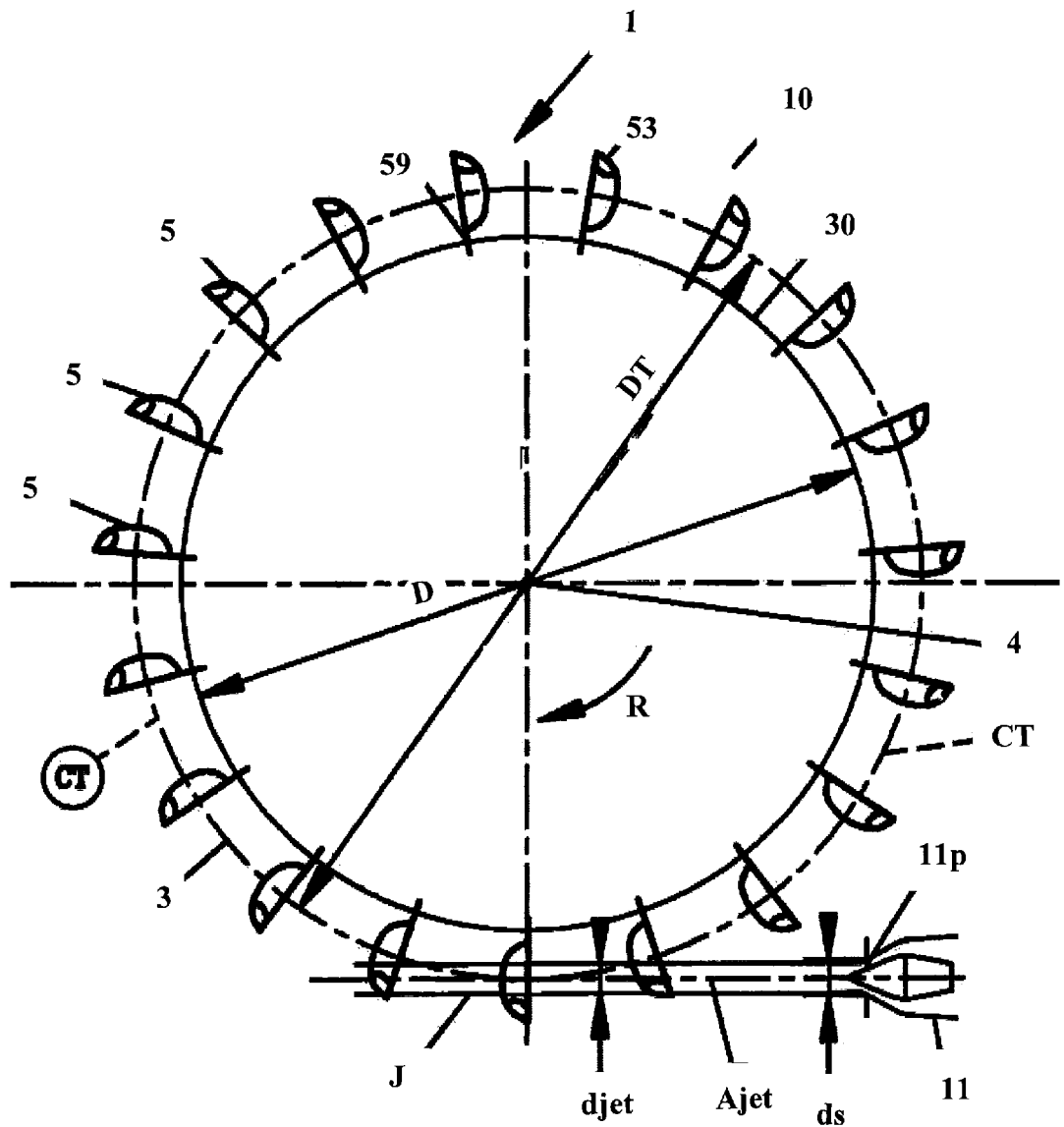
Figure 1B:
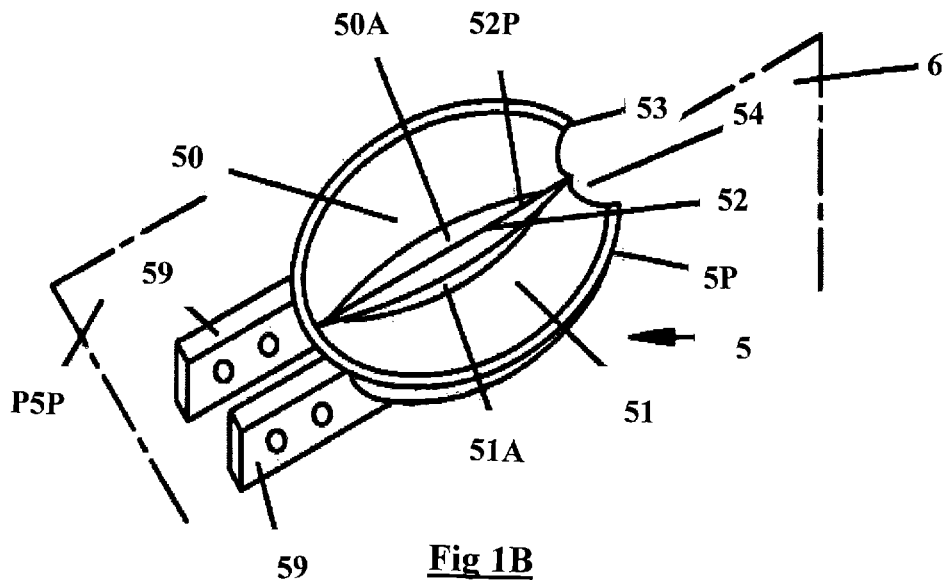
FIG. 1B is a perspective view of a bucket of a turbine known.

The attached drawings are given as preferred embodiments only, except for FIG. 1 which shows a state of the art Pelton turbine. In said drawings, a same reference sign designates similar or identical means, or means ensuring the same function.

FIG. 1 shows a wheel of a known Pelton turbine.

In an example of a known Pelton turbine (1) (conventional Pelton) for a constant water pressure corresponding to a waterfall height of 400 m, the practice is that the wheel (3) is provided with 19 buckets (5) defining a turbine circle (CT) with a diameter DT of about 810 mm, said wheel (3) driving an alternator (2) at a speed of 1000 rounds/minute then ensuring a production of electrical energy of about 200 kW. The yield of the turbine η is then approximately 90-91%. In case of inlet water pressure drop, the yield of the turbine drops significantly.

Thus, if the waterfall height is reduced to 200 m (meaning a drop of waterfall height of 200 m), the electrical energy production is reduced to 100 kW. The yield of the turbine (1) is then reduced to 50% of the optimum yield.

For those skilled in the art, a Pelton turbine must therefore always be dimensioned for a given waterfall height, since the variations in efficiency can be very significant in the event of a variation in the waterfall height.

The turbine according to the invention is a turbine of the type described above, but the modifications made to which make it possible to ensure a substantially constant turbine yield η (for example of approximately 90%), even if the water pressure at the admission varies significantly, for example even if the waterfall height varies from 400 m to 200 m, or even less.

The turbine unit according to the invention is thus characterized in that:

the injector (11) is a variable flow rate injector with a variable passage outlet (11P) defining a variable outlet diameter (ds) as a function of the effective hydraulic pressure (Peff), said variable outlet diameter (ds) varying at least between at least a first outlet diameter (ds1) to ensure a first flow rate of water leaving the injector (11) for a first hydraulic pressure (P1) corresponding to the maximum hydraulic pressure (PMax), and a second outlet diameter (ds2) at least 20% greater than said first outlet diameter (ds1) for a second hydraulic pressure (P2) at least 30% lower than the maximum hydraulic pressure (PMax). The variation in the position of the needle (11A) makes it possible to modify the flow rate of water leaving through the passage outlet (11P) and thus the diameter of the jet (J) leaving the injector (11). FIGS. 2B and 2C show the passage outlet in two different positions of the needle (11A). In FIG. 2C, the needle (11A) is more retracted into the body of the injector (11), so as to increase the passage surface (11P) and the flow rate of water leaving the injector (11). The diameter (ds) is obtained from the water flow continuity equation. The movement of the needle (11A) relative to the body of the injector is for example controlled by a hydraulic cylinder (110) whose rod (110A) is connected to the needle (11A).

Unexpectedly, it was noticed that by using such a turbine, it was possible to guarantee a yield η of about 90%, even in the event of a significant drop in water pressure at the inlet of the injector (11), for example in the event of a reduction in the height of the waterfall from 400 m to 200 m.

This maintenance of turbine efficiency is also combined with the possibility of guaranteeing stable production of electrical energy at the desired nominal power (for example substantially constant power of 200 kW), even in the event of a significant variation in the water pressure at the injector.

In the advantageous represented form of the invention, the edge (52P) of the rib (52) is located above the plane (P5P) of the periphery (5P) of the cavities (50C, 51C), the latter being located below said plane (P5P).

A turbine according to the invention has, for example, compared to the wheel (3) of the turbine of FIG. 1, a reduced wheel diameter, a turbine diameter reduced by 10 to 20%, an increased number of buckets, buckets of larger dimension, a jet diameter which can be increased from simple to double compared to the jet diameter of the turbine of FIG. 1.

Figure 2:
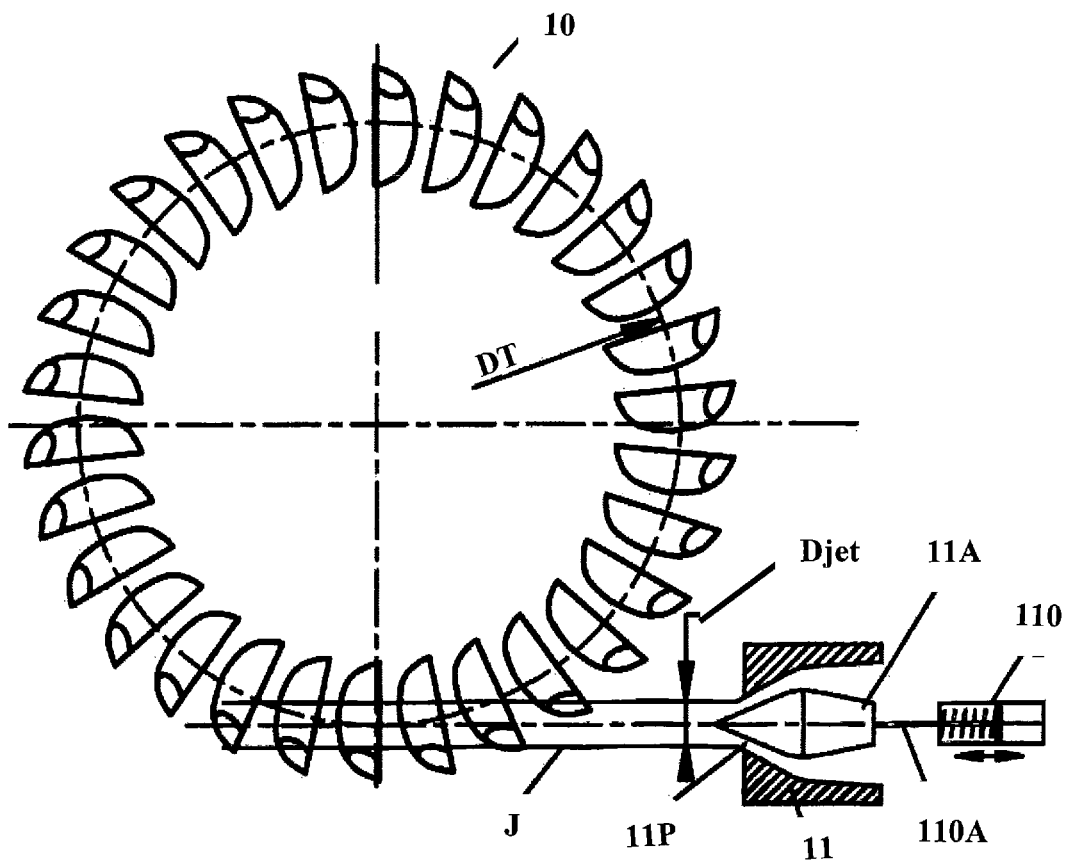
Figure 2B:
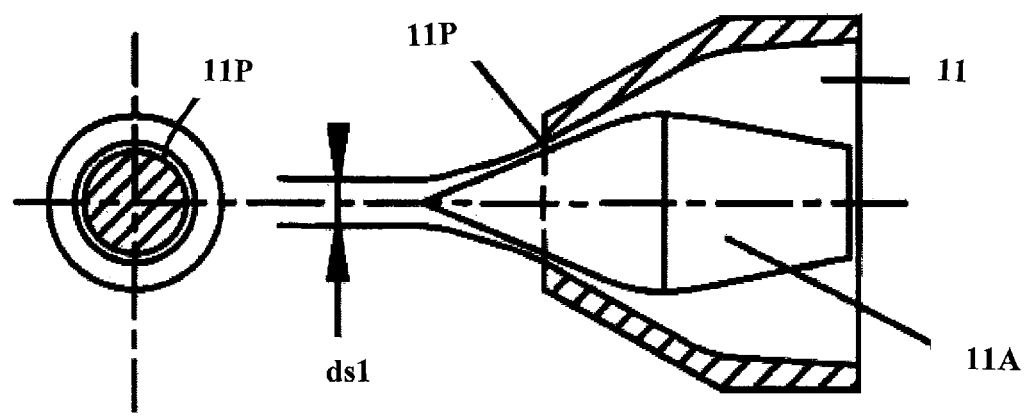
FIGS. 2B and 2C are views in cross-section of the outlet of the injector (11) of FIG. 2 for two different positions of the needle (11 A)
Figure 2C:
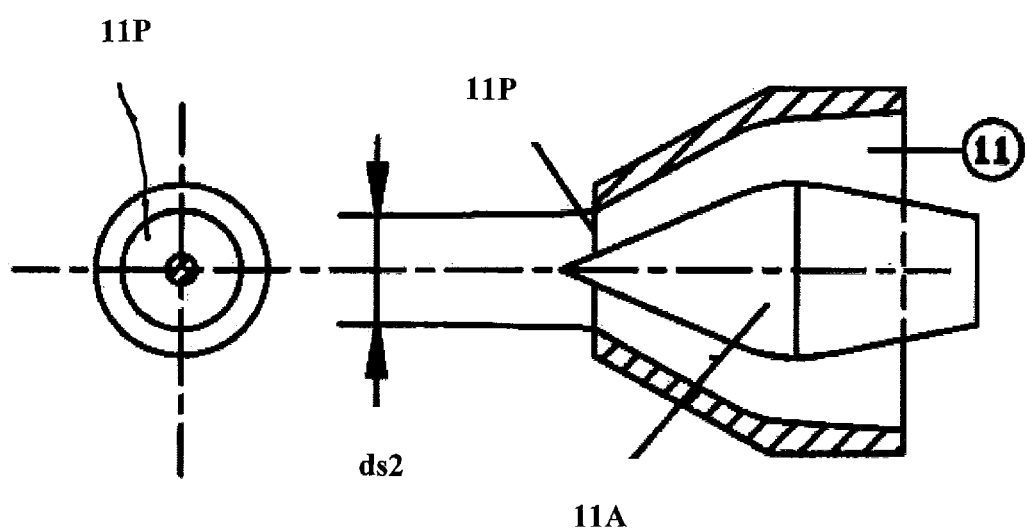

The turbine in FIG. 2 has a number of buckets (which are identical to each other) equal to 30. Advantageously this number would have been odd, for example 29, 31 or 33.

The turbine of FIG. 2 is adapted to be driven at 1000 rounds/minute, with a constant electrical power of 200 kW, with an efficiency of 90%, and this for a waterfall height which can vary from 400 m to 200 m. The diameter of the jet djet is for example 51.8 mm.

The injector (11) is a variable flow rate injector. In one embodiment, the turbine comprises 1 to 3 variable flow rate injectors.

The variable flow rate injector or the variable flow rate injectors is/are each connected to a control device modifying the outlet diameter at least as a function of the effective hydraulic pressure, to ensure a flow rate of water successively towards a or more buckets (5) substantially equal to a predetermined water flow rate or comprised within in a range of variable water flow rate between 0.9 and 1.1 times a predetermined water flow rate. The outlet diameter of an injector is for example modified by a cylinder (110) whose rod (110A) modifies the position of the needle (11A), and thus the open surface for the passage of water through the injector (11). The more the needle is moved inwards of the injector, the more the surface is important. The needle (11A) has a bulbous shape with a tip emerging from the injector chamber. The cylinder (110) is controlled by a control unit receiving one or more information from sensors, including a pressure sensor determining the pressure of the water supplied to the injector or injectors. This cylinder (110) allows movement of the needle in the X direction.

It would have been possible to use other systems to ensure the displacement of the needle 11A relative to the body of the injector, for example a screw system.

In the embodiment of FIG. 3 which is similar to that of FIG. 2, the injector (11) is mounted on a movable support (120) relative to the turbine body (10), so as to modify the position of the central axis (Ajet) of the jet. The mobile support (120) is in particular capable to follow a translation movement in a direction (Y) perpendicular to the central axis (Ajet) of the jet (J) and in a plane perpendicular to the axis of rotation (4) of the wheel (3). This translation movement of the mobile support (120) is for example controlled by a cylinder (121), the hydraulic fluid pressure brought into the chamber of the cylinder (121) being modified so that the spacing of the axis of the jet with respect to the axis of rotation (4) is increased during the drop in pressure of the water supplied to the injector (11).

In this way the position of the central axis of the jet can be modified while ensuring that this axis remains substantially parallel to a determined axis, so as to ensure then a variable engine torque depending on the pressure of the water or the height of the waterfall.

In particular, in the embodiment of FIG. 3 (Pelton Rutten with a turbine circle with a diameter DT of 686.3 mm, rotation of 1000 rounds/minute, 30 buckets, yield η of approximately 90%, for a constant electrical power of 200 kW for a waterfall height that can vary from 400 m to 200 m), the injector (11) is a variable flow rate injector with a variable passage outlet (11P) defining (a) an outlet diameter (ds) variable in function of the effective hydraulic pressure (Peff) and (b) a central variable jet axis substantially parallel to a given axis, said variable outlet diameter (ds) and said central variable jet axis varying at least between on the one hand, a first outlet diameter (ds1) to ensure a first flow of water leaving the injector (11) for a first hydraulic pressure (P1) corresponding to the maximum hydraulic pressure (PMax), said first flow of water leaving of the injector (1) along a first jet axis (djet1) located at a first distance (dd1) from the axis of rotation (4) of the wheel (3), and, on the other hand, a second outlet diameter (ds2) at least 20% greater than said first outlet diameter (ds1) for a second hydraulic pressure (P2) at least 30% lower than the maximum hydraulic pressure (PMax), said second outlet diameter (ds2) ensuring a second flow rate of water leaving the injector (11) along a second jet axis (djet2) substantially parallel to said first jet axis (djet1) and located at a second distance (dd2) from the axis of rotation (4) of the wheel (3), said second distance (dd2) being greater than said first distance (dd1).

Advantageously, the spacing A between the second distance (dd2) and the first distance (dd1) is less than 10%, advantageously less than 5% of said first distance (dd1). With respect to the turbine diameter, the spacing is advantageously less than 10%, preferably less than 5%. For example, the displacement of the central axis (Ajet) of the jet (J) is less than 50 mm, for example from 10 to 30 mm maximum.

In the embodiment of FIG. 3, this spacing corresponds to the movement Y of the movable support relative to the turbine body (10).

The device for monitoring or controlling the outlet opening of the injector is in particular suitable for modifying said second outlet diameter (ds2) by substantially following a function depending on the power ¾ of the ratio of the maximum hydraulic pressure to the second hydraulic pressure.

FIGS. 4 to 9 are views of an injector capable of modifying the outgoing flow rate by modifying the passage surface (11P), but also the position of the central axis (Ajet) of the jet (J).

The injector includes a body (11) defining a substantially conical interior chamber (11C). The needle (11A) comprises at least (a) a substantially frustoconical first part (11E) ensuring, when this part (11E) is adjacent to the open end of the injector (11), a substantially annular or circular passage (11P) (circular crown) then generating a jet (J) along a central axis substantially corresponding to the axis of symmetry (A11) of the frustoconical chamber of the injector (11) in the vicinity of its opening (11P), and (b) a second part (11F) eccentric with respect to the axis of symmetry (A11). Said second part (11F) has a cross-section (perpendicular to the central axis (A11) of the inner chamber (11C) of the injector (11)) which is variable, but adapted so that when the second part (11F) extends at the level of the open end of the injector (11), the passage surface (11P) is defined between an outer circle defined by the circle of the cross section of the inner chamber (11C) in the vicinity of its opening (11P), and an inner circle eccentric relative to the outer circle, and relative to the axis (A11).

The inner circle is defined by the cross section of the second part (11F) of the needle (11A) at the level of the opening (11P). Depending on the eccentric position of the inner circle by the section of the second part (11F) at the level of the opening (11P), it is possible to have an eccentric position for the central axis (A11') of the jet (J) leaving the injector (11).

The displacement of the needle (11A) relative to the body of the injector (11) is for example operated by a jack or by a system allowing axial displacement (in the direction of the axis (A11) and/or a displacement of rotation (RR) of the needle (11A) around the central axis (A11) of the body of the injector (11).

Figure 5:
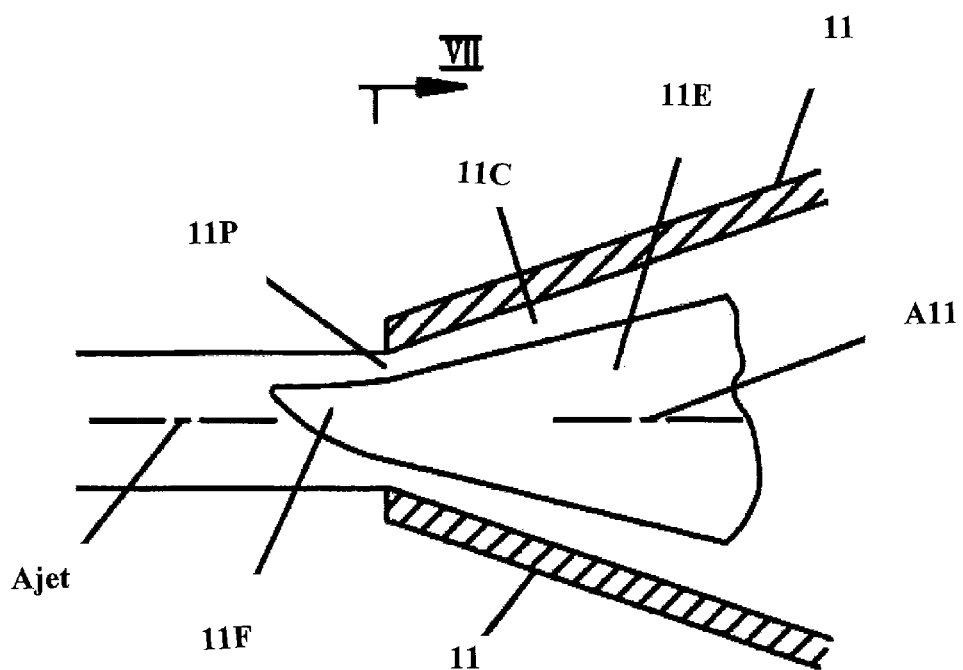
FIGS. 5 and 6 are sectional views, on a larger scale, of the injector with the needle respectively in a first position controlling a first jet with a first diameter centred along a first axis, and in a second position controlling a second jet with a diameter larger than said first diameter and centred along a second axis parallel to said first axis but farther from the axis of rotation of the wheel.
Figure 6:
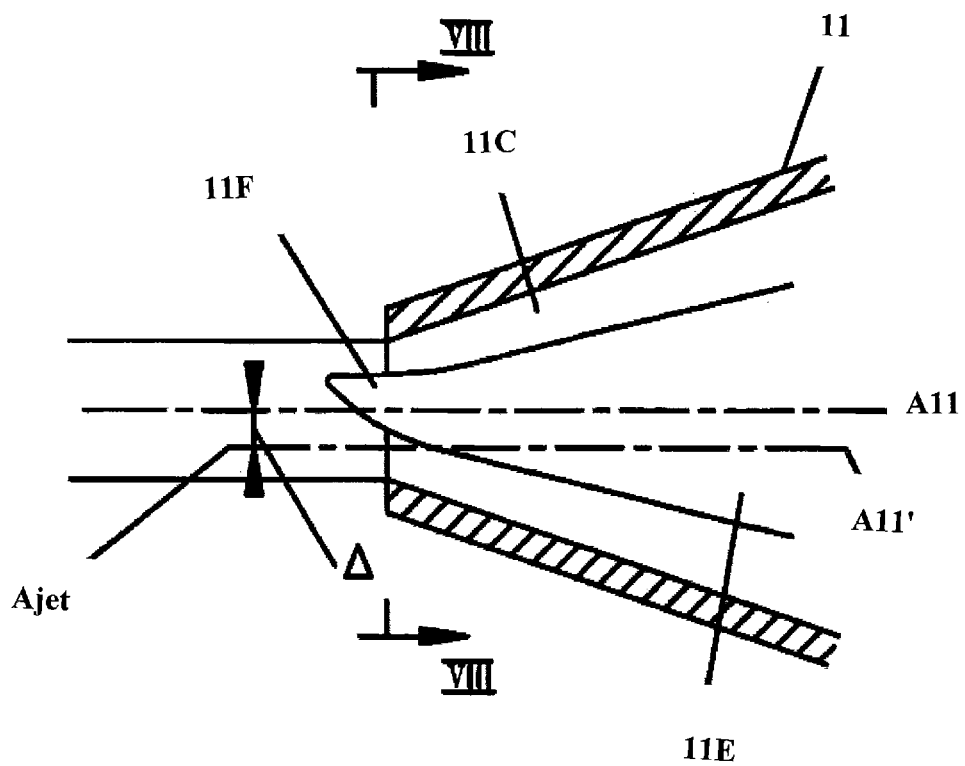
Figure 7:
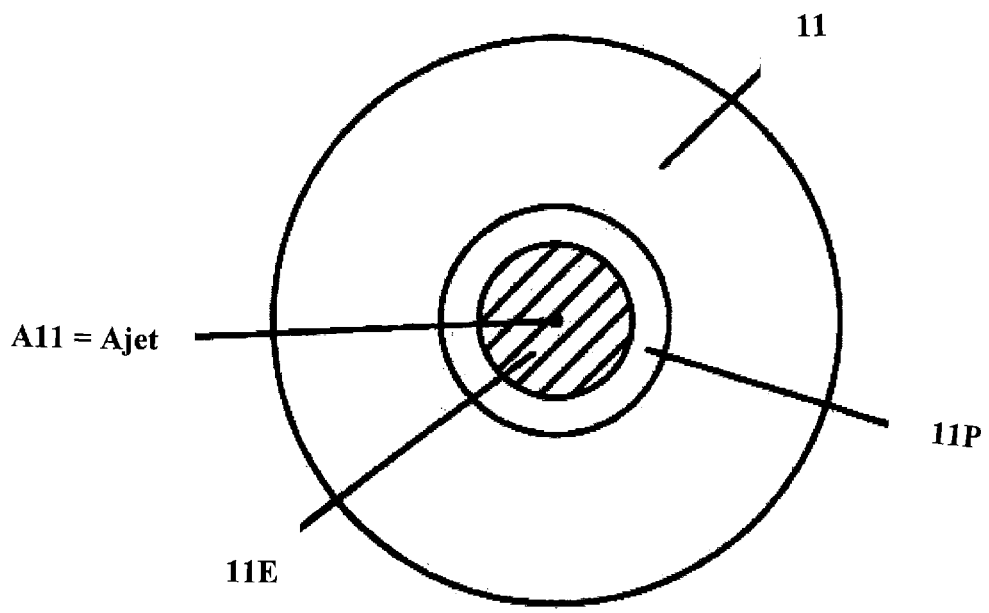
FIGS. 7 and 8 are sectional views respectively of FIGS. 5 and 6, along the lines VII-VII and VIII-VIII.
Figure 8:
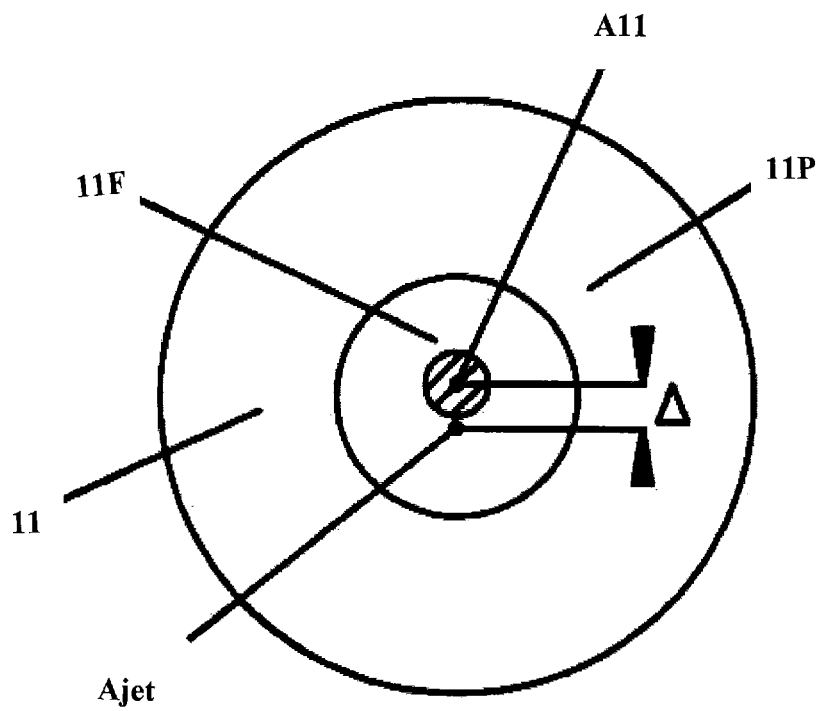

In FIG. 5, the first part (11E) extends at the level of the opening (11P), so as to define an annular opening. The jet (J) leaves the injector to define a jet axis (Ajet) located substantially along the axis (A11) of the inner chamber of the injector (11). In the position of FIG. 6, the part (11F) of the needle (11) is located at the level of the passage (11P), thus defining a passage surface defined between two eccentric circles, so that the axis of the jet (Ajet) is offset from the central axis of the injector chamber (11).

Figure 4:
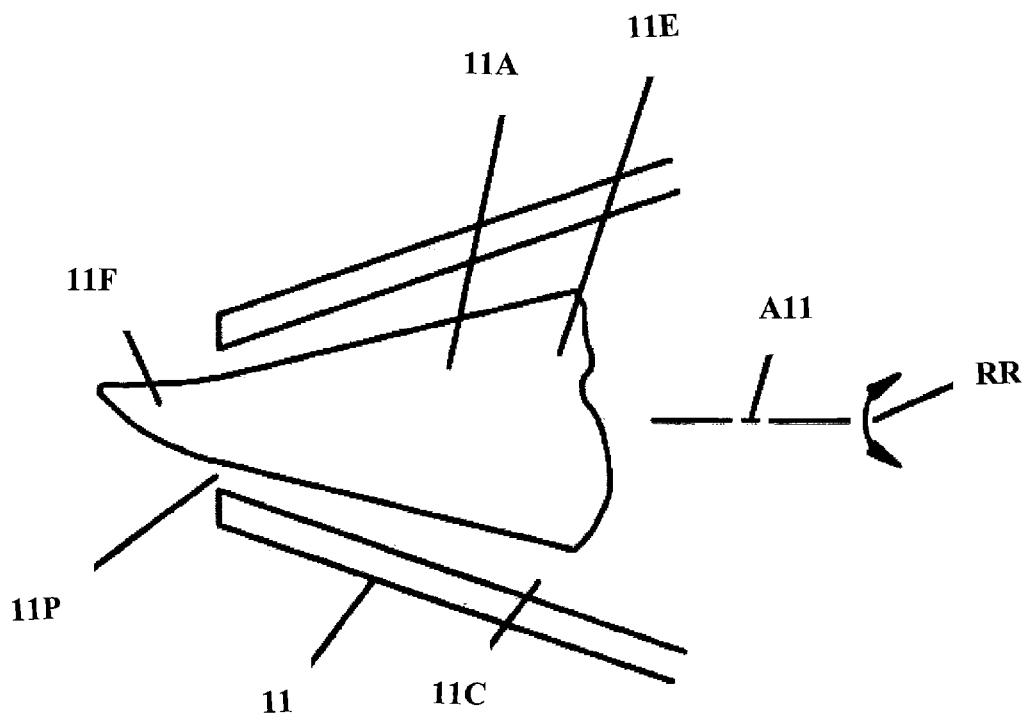
FIG. 4 is a sectional view of a modified needle injector.
Figure 9:
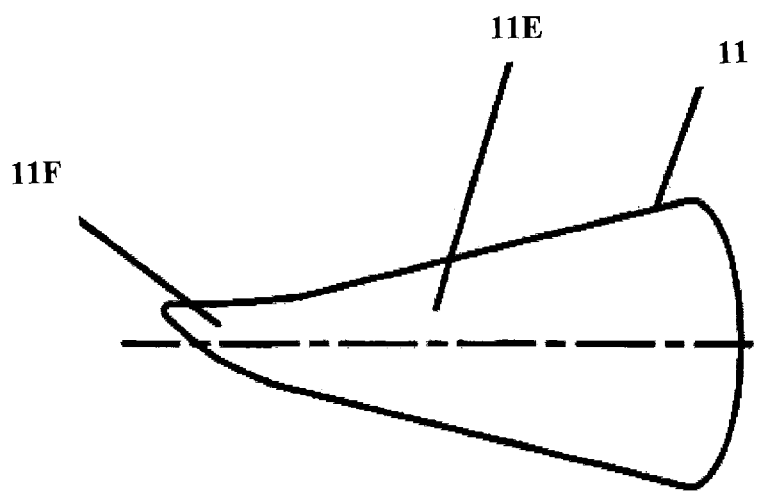
FIG. 9 is a perspective view of a second embodiment of the modified needle.
Figure 10:
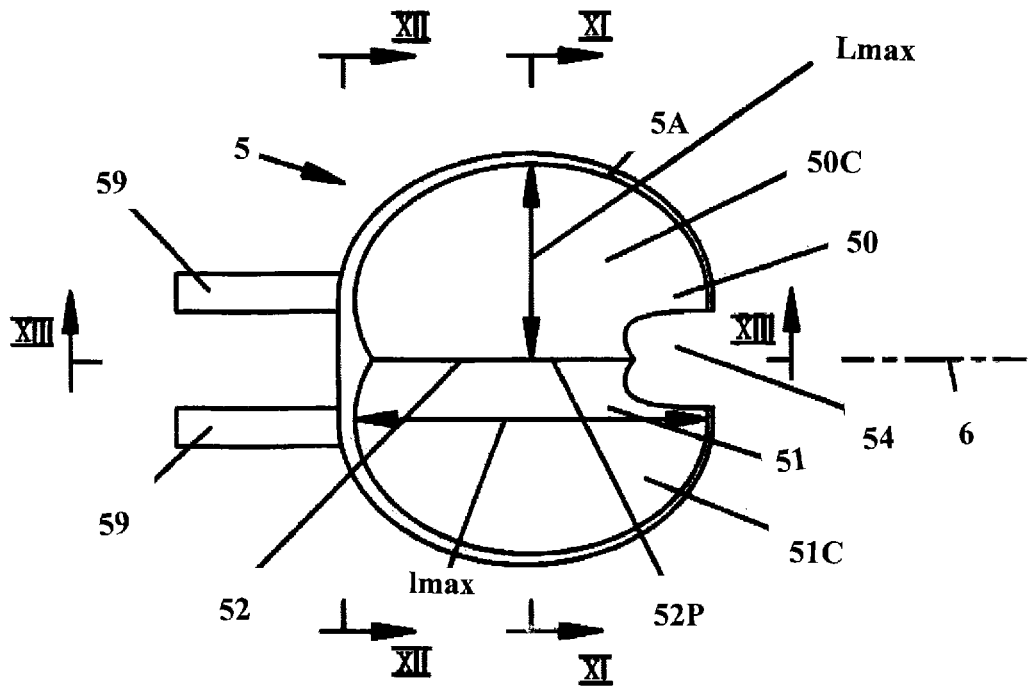
FIG. 10 is a front view of a bucket of a wheel according to the invention.
Figure 11:
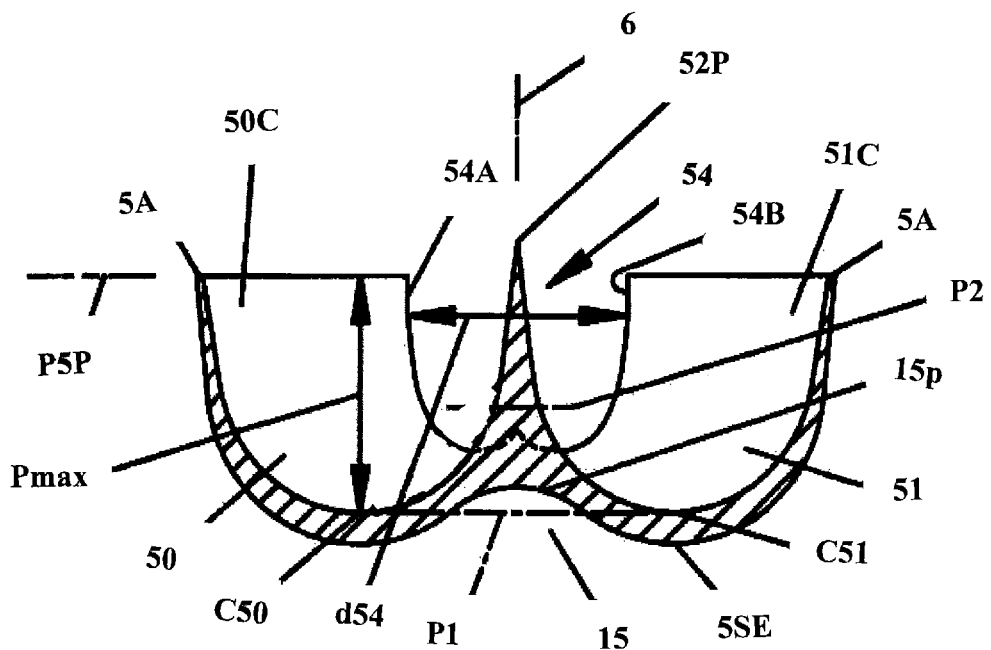
FIG. 11 is a sectional view of the bucket of FIG. 10 along line XI-XI.
Figure 12:
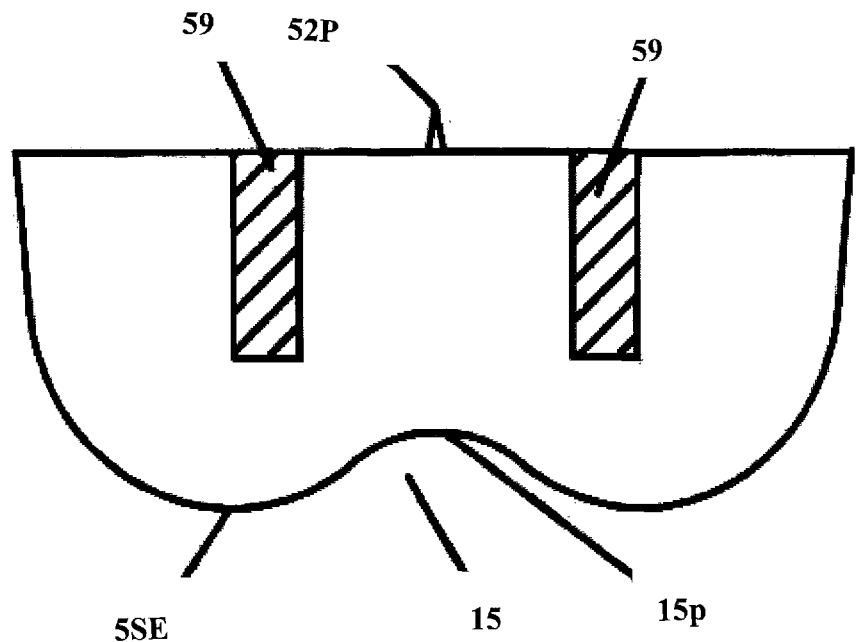
FIG. 12 is a sectional view of the bucket of FIG. 10 along the line XII-XII.
Figure 13:
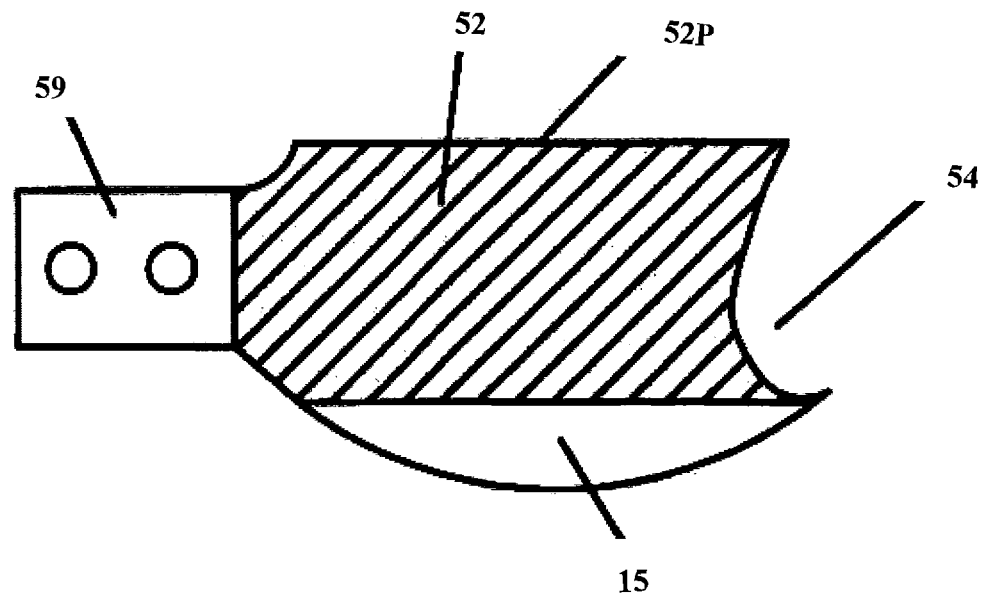
FIG. 13 is a sectional view of the bucket of FIG. 10 along the line XIII-XIII.
Figure 14:
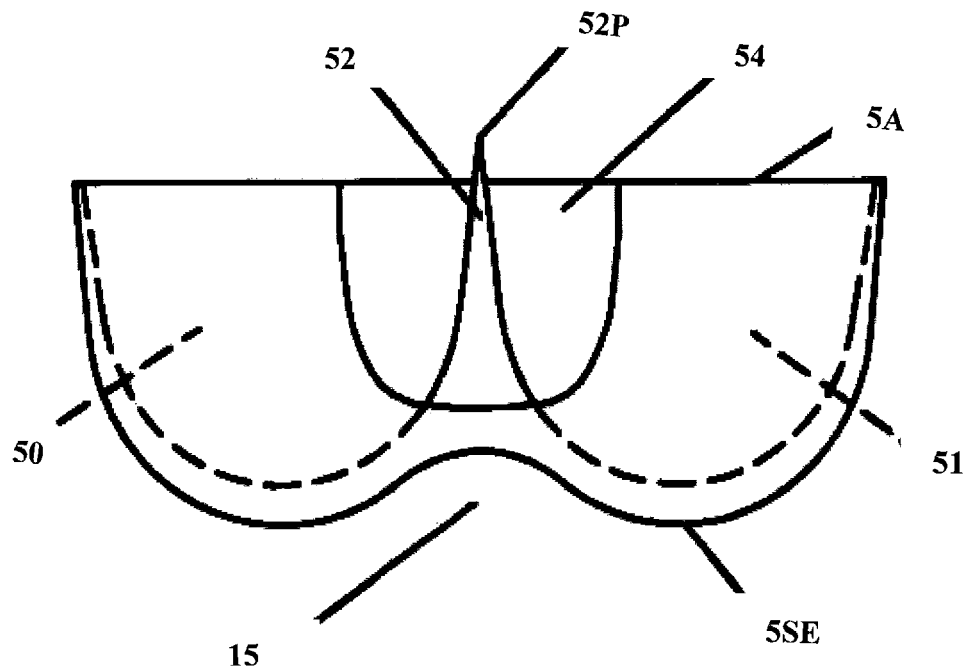
FIGS. 14 and 15 are side views of the bucket of FIG. 10.
Figure 15:
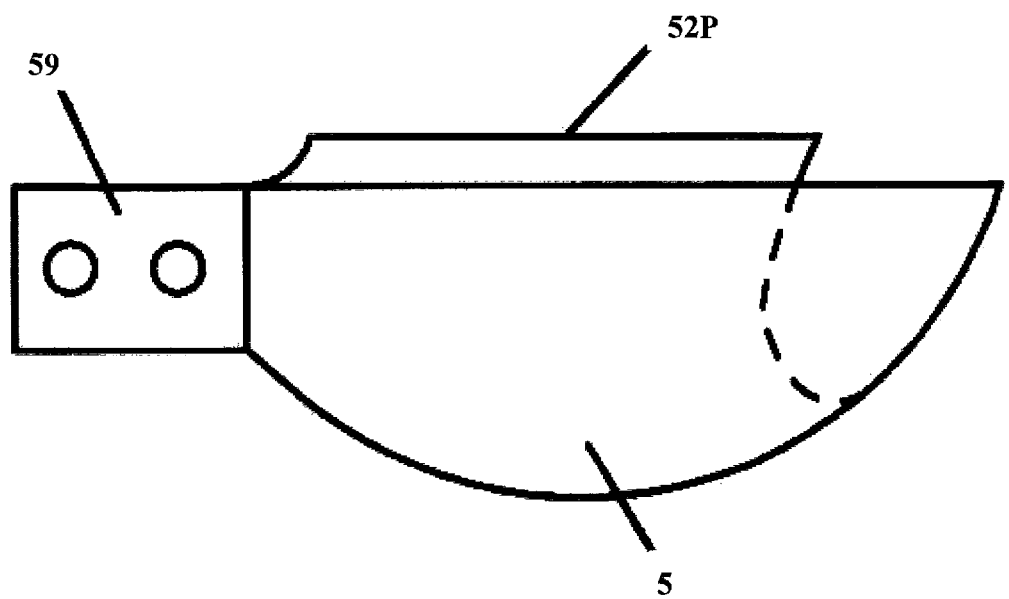

FIG. 9 is a perspective view of the needle (11A) of FIG. 4. In the shown embodiment, the free end of the second part (11F) of the needle (11) is slightly rounded.

Figure 16:
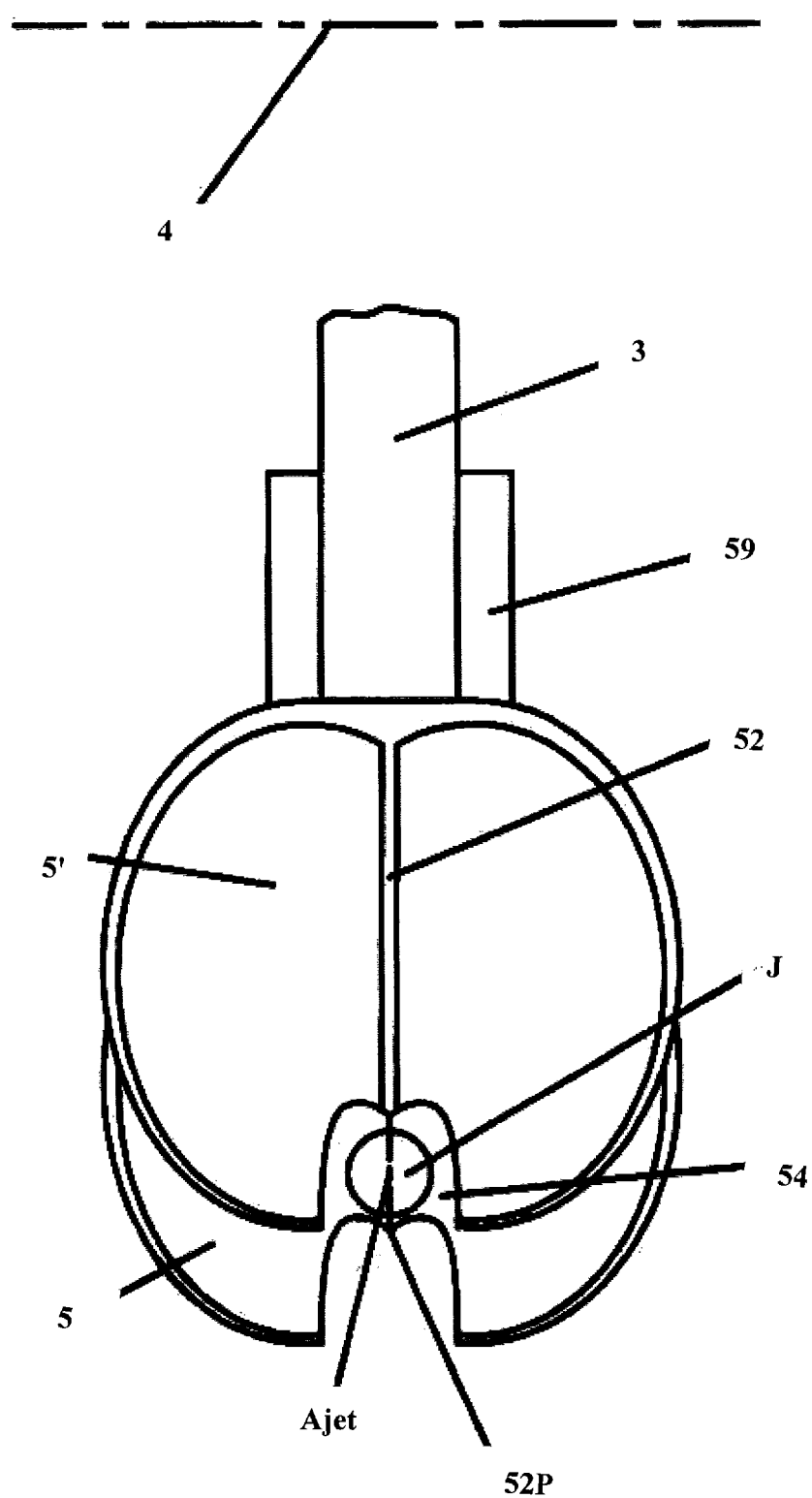
FIGS. 16 and 17 show respectively on the front face the point of impact of a jet (J) with a first diameter on a bucket (5), said jet passing through a notch (54) of another bucket, before that the rotation of the wheel causes said jet to strike said other bucket, and in the transverse plane said point of impact of said jet.

FIG. 16 shows a first bucket (5) of the wheel (3) on which the jet (J) of the injector acts. This first bucket (5) is located behind another bucket (5'), so that the jet (J) crosses the notch (54) of this other bucket (5') before contacting the first bucket (5) in a direction substantially perpendicular to the axis of rotation (4) of the wheel (3) and perpendicular to the edge (52P) of the central rib (52), this central rib (52) then dividing the jet (J) into two substantially equal portions towards the bottom of the cavities (50C, 51C) before the water is ejected via the side walls without contacting the outer surface (5SE) of said other bucket (5') (outer surface facing the first bucket (5)).

Figure 17:
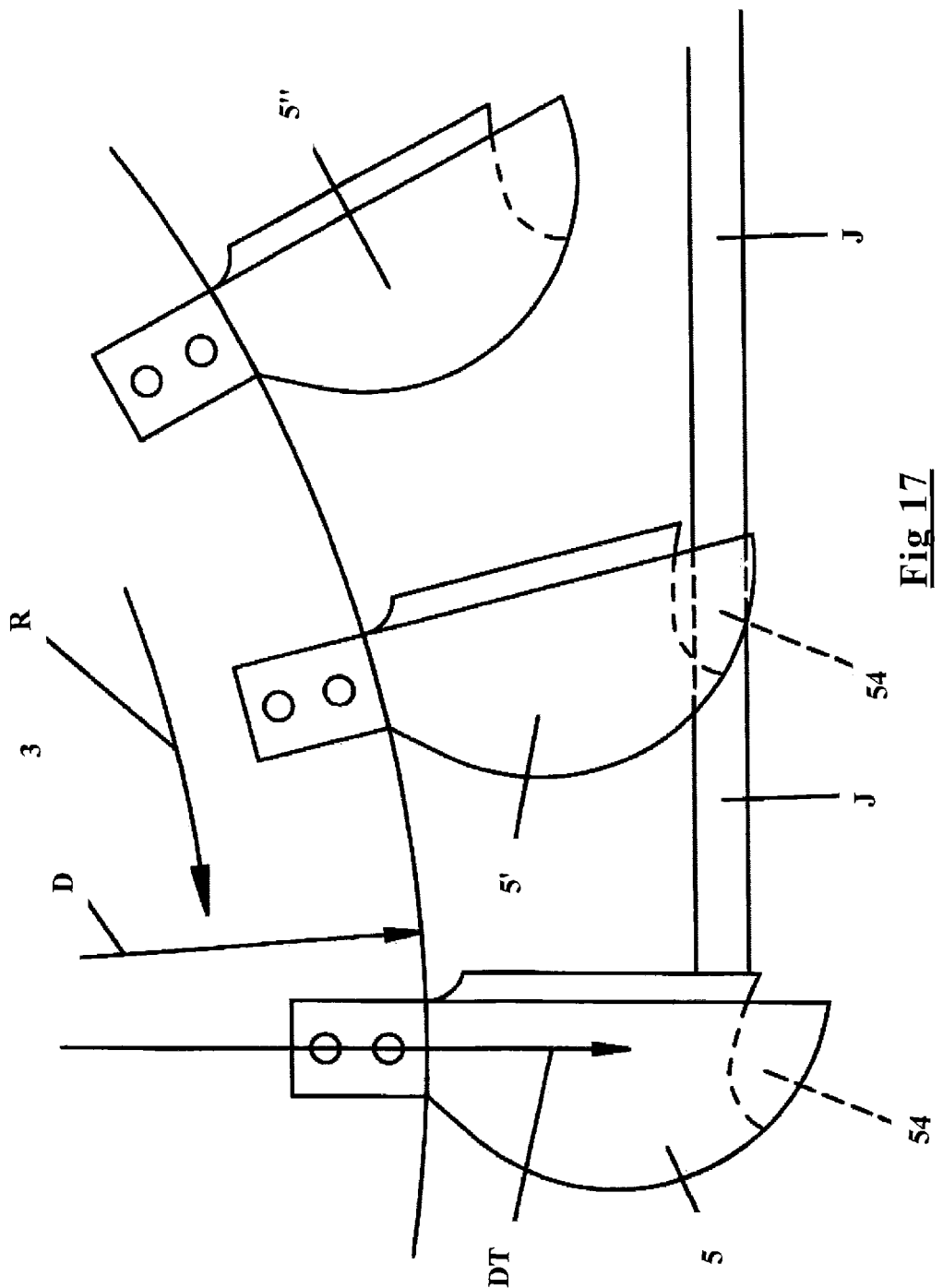

FIG. 17 is a side view of the path of a jet (J) leaving an injector (11). As it can be seen, the jet (J) crosses at least the notch (54) of a bucket (5') before reaching the bucket (5) located at the rear to produce a motor torque at the wheel (3) in direction (R). During this rotation (R), the jet (J) will contact less and less the bucket (5) located at the rear, and more and more the bucket (5') located in front of the rear bucket (5). By rotating the wheel (3), the bucket (5') will take the position of the bucket (5), while the bucket (5") will take the position of the bucket (5').

Figure 18:
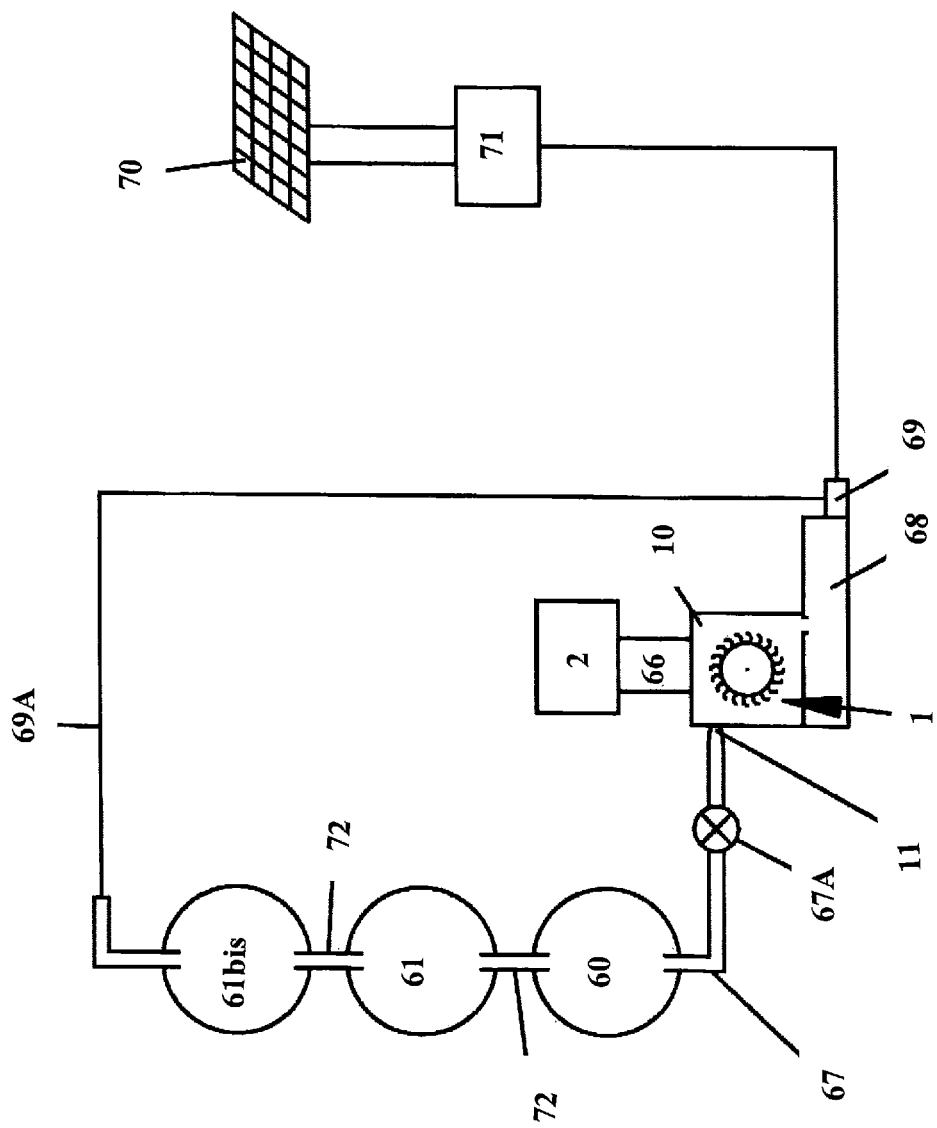
FIG. 18 is a schematic view of an installation according to the invention.
Figure 19:
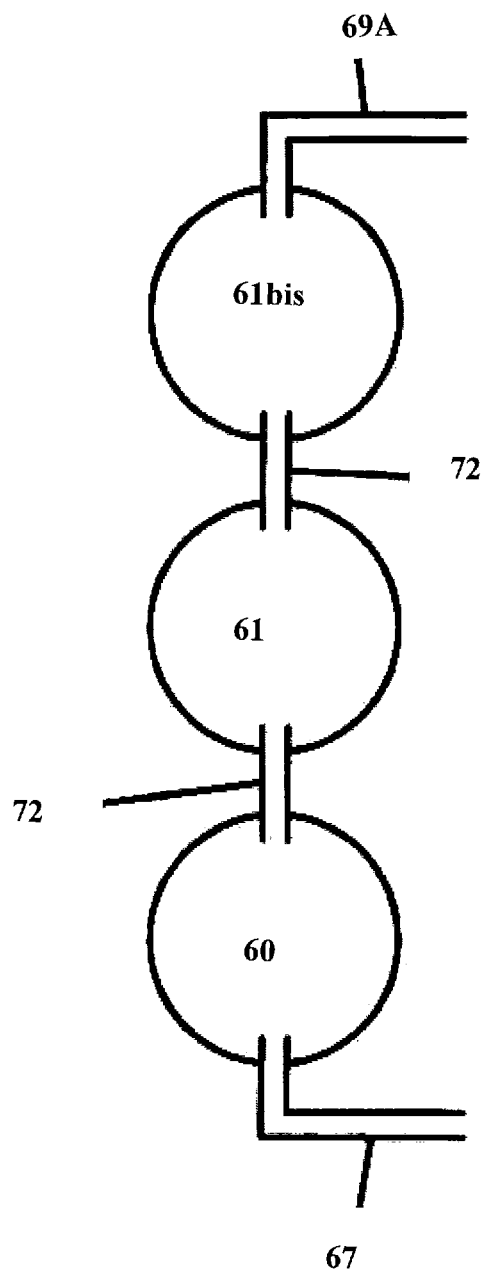
FIG. 19 is a detail view of two or three tanks connected together.

FIG. 18 schematically represents an installation for the production of electrical energy according to the invention. This installation comprises at least one basin or reservoirs (60,61,61bis) for storing water with a maximum hydraulic pressure of between $15 \times 10^5$ Pa and $250 \times 10^5$ Pa (according to an alternative, the installation is associated with a water supply with a maximum waterfall height comprised between 150 m and 500 m), at least one turbine (1) according to the invention, at least one alternator (2), at least one kinematic device (66) connecting the shaft of the turbine (1) to a drive shaft of the alternator (2), and at least one pipe (67 with a valve 67A) to bring the water from the basin or tank(s) (60,61,61bis) to the or injector(s) (11) of the turbine (1).

The installation further comprises a collecting tank (68) for collecting water from a storage basin or tank(s) (60,61, 61bis) after the water action on the wheel (3) of the turbine, and a pumping device (69 with a pipe 69A) for bringing water from the collecting tank (68) back to the storage basin or to the pressurized water tank(s) (60,61,61bis).

The installation is advantageously associated with a device (70) for supplying electric current from photovoltaic panels and/or wind turbines (other sources are possible. The energy sources are preferably green or renewable energies), said supply device (70) being advantageously associated with an inverter for supplying current to the pump (69) to bring water back into the reservoirs (60, 61,61bis) and put this water under pressure. The green or renewable electrical energy supply device is advantageously suitable for supplying during the day at least a quantity of energy corresponding to the energy stored in the reservoirs, and intended to supply one or more users. This or these users are thus supplied during the day by the supply device (70) and at night by the installation according to the invention.

When water is pressurized, for example at a maximum pressure of 30 to $40 \times 10^5$ Pa, the tanks or cisterns (60,61, 61bis) advantageously have the form of pipes or tubes with a diameter of 1 m to 3 m, closed at their opposite ends by a cover. The pipes or tubes, advantageously made of steel resistant to oxidation or corrosion and/or provided with one or more protective layers, are advantageously placed substantially horizontally, one above the other. A pipe (72) connects two adjacent tanks.

The water from the collecting basin (68) is brought back into the upper cistern (61a) by the pumping device (69). This pumping device (69) is advantageously supplied with electrical energy by the photovoltaic panels (70), possibly with the interposition of an inverter or other control devices.

This pumping device (69) is suitable for pressurizing water and to send it to the tanks (60,61,61bis) still containing pressurized gas (this pressure corresponds to the pressure still present in the tanks when they are substantially empty of water). The gas putting the water under pressure in the tank(s) (60,61,61bis) is air, nitrogen or any other gas whose dissolution in water is very low. From this point of view, $CO_2$ is not advantageous, given its great dissolution in water. In addition, in the event of a gas leak in a closed enclosure, the excess $CO_2$ can be a source of health problems. The supply of water to the cisterns makes it possible to increase the pressure of the air contained in the cisterns.

The water pump can thus inject water into the cisterns (60,61,61bis) at a pressure of up to $45 \times 10^5$ Pa, or even more.

Pressurized tanks are equipped with a safety device to prevent accidental overpressure in one or more tanks.

To bring water from one or more tanks to the injector (11), a pipe (67) extends between the lower tank (60) and the injector (11). This pipe (67) has one end extending above the bottom of the lower tank (60), this to ensure that a minimum volume of water is always present in the lower tank (60). A valve system (67A) makes it possible to supply the injector with water or not. It is the injector(s) that regulate(s) the flow of water and give the power to the turbine.

Such an installation makes thus possible to store electrical energy in the form of potential energy, for example during the day, while allowing it to be used when needed, with the least possible loss during its transformation into electric energy, for example at night. The transformation also takes place with great stability.

The invention also relates to a method for producing electrical energy, and advantageously also for storing potential energy for the production of electrical energy, in which an installation according to the invention is used, for example as described above. In this method, the potential energy of the water contained in the basin or storage tank (60,61,61bis) is converted into electrical energy.

Figure 20:
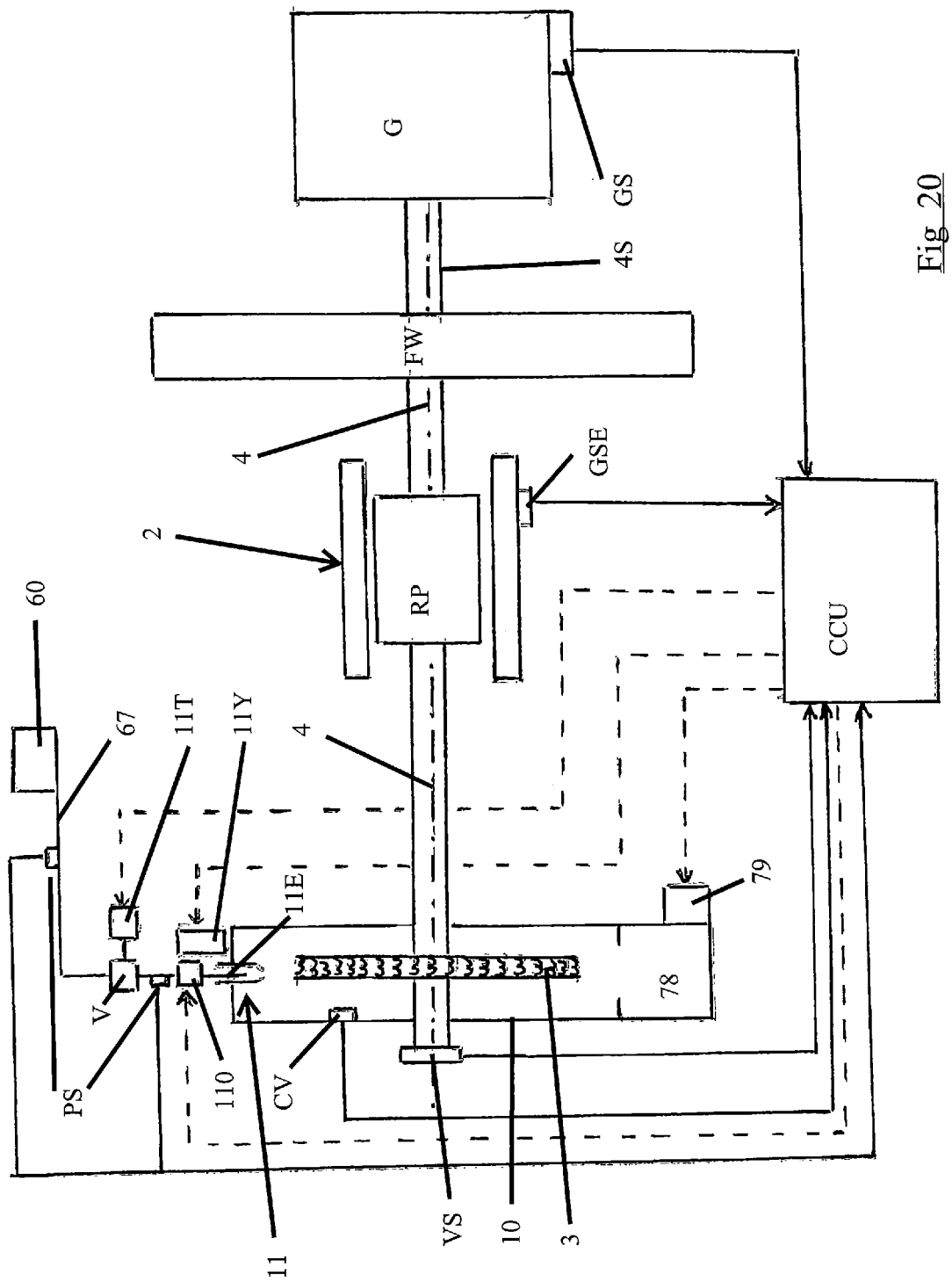
Figure 21:
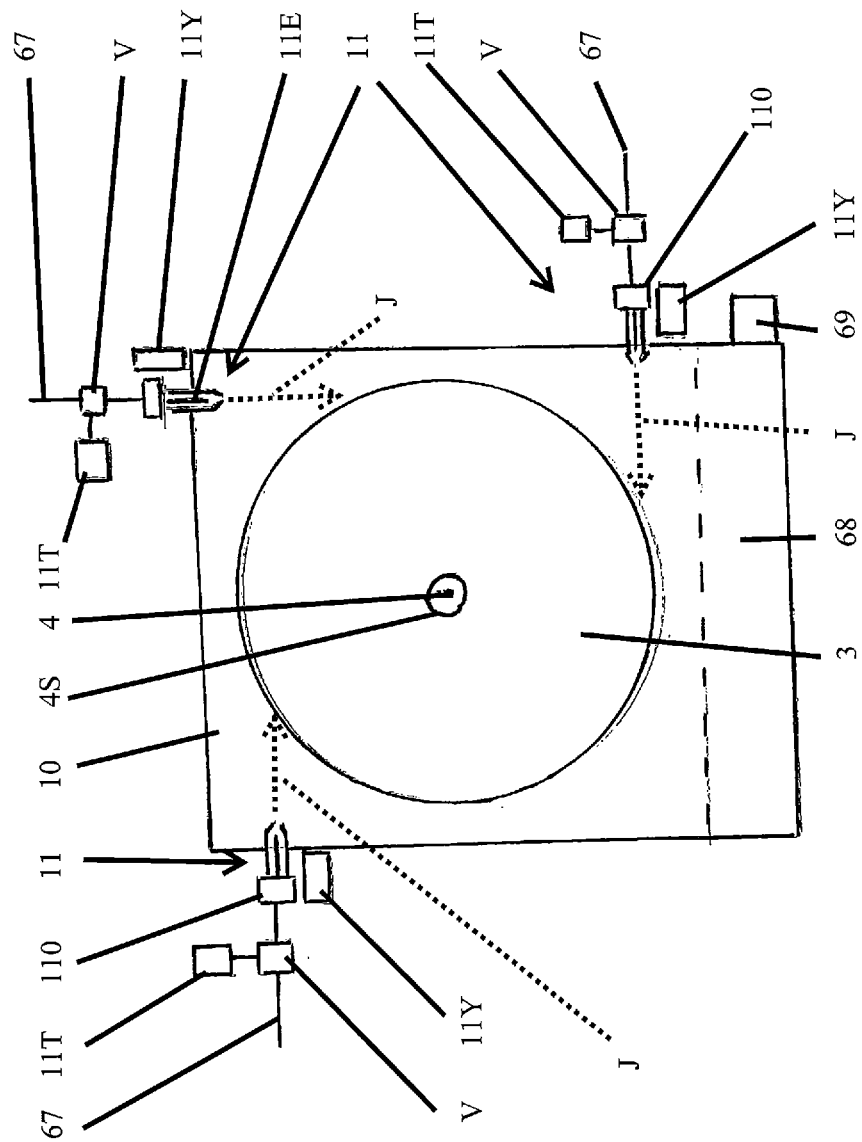
FIG. 21 is a view of the wheel of the turbine unit of FIG. 20, associated to at least one variable flow rate injector with a trigger valve system.

FIG. 20 is a schematic view of a turbine unit of the invention associated to an alternator and to a flywheel FW, while FIG. 21 is a view of the bucket wheel (3) of the turbine unit of FIG. 20, associated to three variable flow rate injectors (11), each being provided with a trigger valve system (11T). Each variable flow rate injector is associated to water jet axis modification means 11Y (such as a cylinder 121) for modifying the distance between the central axis of the water jet with respect to the axis of rotation, and to a cylinder 110 for adapting the position of the needle 11E and thus for adapting the outlet passage of the injector 11 (for adapting at least the water flow rate. The flywheel FW, the rotating part RP of the alternator 2 and the wheel 3 with the buckets are mounted on a same horizontal shaft 4S, whereby increasing the stability of the electric production. The injectors 11 are placed with respect to the wheel 30, so that a first injector is directing its water jet in a downwards vertical direction, while the two others are directing their water jet in horizontal direction. Said water jets are all directed successively towards buckets in a sense for driving clockwise the wheel 3.

In this embodiment of FIG. 20, the turbine unit is used as a no electric break unit, i.e., for generating electric power as soon as the generator G is no more driving into rotation the central shaft 4S.

The turbine unit is provided with various sensors, namely a cavitation sensor CV (mounted on the body 10 of the turbine 1), a pressure sensor PS mounted on the water pipe 67 conducting water to the injectors 11 (advantageously for each injector 11, a pressure sensor PS is located adjacent to the injector), vibration sensor VS (for example determining vibration at the shaft level).

Each injector 11 is associate to a valve V, controlled by a valve trigger system 11T.

When using the turbine unit of the invention as a no break unit, the valve V for each injector 11 is not in a fully closed position so as to enable the passage of a low water flow rate through the injector considered, said low flow rate not contacting for example the buckets 5 of the wheel 3 as long as the generator G is working correctly for the generation of electric power. By keeping a low water flow rate through the injector, it is possible to control in continue the good working of the valve, and the movement of the valve towards its fully open position is facilitated and can be carried out in an extremely short time by the trigger system (11T), for example an electromagnet trigger, adapted for ensuring a substantially fully open position in less than 50 ms, such as in less than 20 ms, or even lesser.

The generator G is provided with a sensor GS adapted to determine substantially immediately when the generator G is lacking power, for example when the generator has a defect for driving correctly the alternator 2. Said sensor can also be an electrical sensor GSE determining an electrical power drop at the alternator level.

All said sensors emit signals and send said signals to a central control unit CCU adapted for treating said signals for determining working parameters to different elements of the turbine unit, at least for guaranteeing constant electrical generation, substantially without vibration and cavitation, while ensuring a turbine efficiency of more than 88%, such as more than 90%.

Various working parameters are:
signals send to the valve trigger system 11T for opening the valves V, when a electrical break is determined
signals for at least partial closing the valves to the valve trigger system 11T, when the wording of the generator G is back appropriate, or when a new generator is taking over the adequate working of the generator G;
signals send to the injectors for adapting the passage outlet 11P thereof;
signals send to the water jet axis modification means;
signals send to the pump 69 for recycling back water from the collecting tank 68 to the pressurized supply tanks 60,61,61bis.

The central control unit CCU is adapted for controlling one or more of the following steps of the method of the invention:
supplying water from the at least one supply reservoir to the said at least one water injector via the at least one pipe;
directing at least a water jet (J) from the at least one water injector (11) successively towards at least one bucket of the series of buckets of the wheel (3), so as to drive the wheel into rotation around the axis of rotation (4), while driving into rotation the rotatable part of the alternator via the at least one kinematic device; and
producing electrical energy by rotating the rotatable part of the alternator.
collecting water from the at least one water jet directed successively towards at least one bucket of the series of buckets of the wheel (3) of the variable flow rate turbine into the collecting reservoir, and
pumping via the pumping device, water from the collecting reservoir for bringing water back to the at least one supply reservoir, for storing said water as potential energy in the at least one supply reservoir.
producing electric energy from the electric supply device;
conducting at least a portion of said electric energy produced from the electric supply device to the pumping device for pumping water at least from the collecting reservoir and for bringing water back to the at least one supply reservoir, for storing said water as potential energy in the at least one supply reservoir.
controlling the step of directing at least a water jet (J) from the at least one water injector (11) successively towards at least one bucket of the series of buckets of the wheel (3) for adapting the flow rate of water directed successively towards at least one bucket of the series of buckets of the wheel (3), so as to ensure a turbine efficiency of at least 88% for the said at least one variable flow rate turbine, despite the at least one potential energy drop.
controlling the step of directing at least a water jet (J) from the at least one water injector (11) successively towards at least one bucket of the series of buckets of the wheel (3) for adapting the flow rate of water directed successively towards at least one bucket of the series of buckets of the wheel (3), so as to ensure a turbine efficiency of at least 90% for the said at least one variable flow rate turbine, despite the at least one potential energy drop.
controlling the working of one or more water injectors independently the one from the other;
modifying the variable outlet diameter (ds) at least as a function of the variable effective hydraulic pressure (Peff), in order to ensure a flow rate of water directed successively towards at least one bucket (5) of the said series of buckets (5) selected from the group consisting of a water flow rate substantially equal to a predetermined water flow rate and a water flow rate comprised within a range of water flow rates varying between 0.9 and 1.1 times a predetermined water flow rate, said method comprising at least the following steps:
determining the variable effective hydraulic pressure,
determining an adapted outlet diameter at least as a function of the variable effective hydraulic pressure (Peff), in order to ensure a flow rate of water directed successively towards at least one bucket (5) of the said series of buckets (5) selected from the group consisting of a water flow rate substantially equal to a predetermined water flow rate and a water flow rate comprised within a range of water flow rates varying between 0.9 and 1.1 times a predetermined water flow rate, and
adapting the variable outlet diameter (ds) to the determined adapted outlet diameter.
modifying the central axis of the water jet issuing from the variable flow rate injector (11) substantially parallel to a predetermined axis, as at least as a function of the variable effective hydraulic pressure (Peff) in order to ensure a turbine efficiency of more than 88%, said method comprising at least the following steps:
determining the variable effective pressure,
determining an adapted central axis of the water jet issuing from the variable flow rate injector so as to ensure a turbine efficiency of more than 88%, and
controlling the water jet axis modification means to adapt the central axis of the water jet of the variable flow rate injector to the determined adapted central axis.
modifying the variable outlet passage (11P) in function of a given hydraulic pressure comprised between the first hydraulic pressure (P1) and the second hydraulic pressure (P2), so that for said given hydraulic pressure, the variable outlet passage has an outlet diameter at least substantially function of the ratio of maximum hydraulic pressure to said given hydraulic pressure, to the power of ¾, said method comprising the steps of:
determining the variable effective hydraulic pressure of the water jet (J),
determining an adapted outlet diameter for the variable outlet passage at least as substantially function of the ratio of maximum hydraulic pressure to said determined variable effective hydraulic pressure, to the power of ¾, and
adapting the variable outlet passage (11P) to the determined adapted outlet diameter.
modifying the variable outlet diameter (ds) of the variable passage outlet (11) by following at least one pre-established curve selected from the group consisting curves pre-established based on turbine vibrations for at least one series of different water flow rates and/or for at least one series of different water pressures, curves pre-established based on turbine cavitations for at least one series of different water flow rates and for at least one series of different water pressures, curves pre-established based on turbine vibrations and turbine cavitations for at least one series of different water flow rates and for at least one series of different water pressures, and combination thereof, so as to adapt at least one variable element selected from the group consisting of a variable element modifying the variable passage outlet of the variable passage outlet (11P), a variable element of the water jet axis modification means, and combination thereof, so as to reduce at least one of the group consisting of cavitations and vibrations, while ensuring a turbine efficiency greater than 88%, said method comprising at least the following steps:
determining a sensor parameter selected from the group consisting vibration parameter, cavitation parameter and combinations thereof from the said at least one sensor,
determining the variable effective pressure of the water jet (J),
determining at least partly from the said at least one pre-established curve, at least one determined variable element selected from the group consisting of a determined variable element modifying the variable passage outlet of the variable passage outlet (11P), a determined variable element of the water jet axis modification means, and combination thereof, so as to reduce at least one of the group consisting of cavitations and vibrations, while ensuring a turbine efficiency greater than 88%,
adapting the variable element to the determined variable element.

said method comprising the following steps:
receiving an electric supply defect information from an electric supply unit supplying an electric consuming installation, said electric supply defect information being selected from the group consisting of electric break from the electric supply unit and electric shortage from the electric supply;
activating the trigger control element for adapting the valve passage of the controlled supply valve from its second valve passage to its first valve passage in less than 100 milliseconds;
supplying the at least one water injector (11) with a first flow rate for generating a water jet at least towards one bucket of the series of buckets of the wheel (3), whereby driving into rotation the rotatable part of the alternator and generating electricity at least for supplying the electric consuming installation.
maintaining the flywheel and the wheel (3) in rotation at an appropriate rotation speed;
in case of receipt of the electric supply defect information, supplying water to the at least one water injector (11), for driving into rotation the rotatable part of the alternator and generating electricity, while ensuring the flywheel and the wheel to further rotate around the axis of rotation (4) at a speed substantially equal to the appropriate speed.

FIGS. 20 and 21 are specific views of a preferred water injector 11 connected to one or more water tanks containing water under a pressure of 200 bars ($200 \times 10^5$ Pa) (via pipe system 67), said water injector being a preferred embodiment of an injector for a turbine unit of the invention used in a no break unit or in an uninterruptible power supply (UPS). The goal of a no break unit is to limit the electric power supply interruption as short as possible, such as less than 50 milliseconds, less than 30 milliseconds, or less than 15 milliseconds, as In the no break unit, the turbine 1 (such as the turbine of FIG. 2) is for example rotated permanently at a synchronization speed of 3000 rpm, if the alternator has a pair of poles or 1500 rpm, if the alternator has two pairs of poles. The turbine is mechanically coupled to the alternator (2), as well as to the flywheel (FW), and to a driving axis of an emergency electrical supply engine (such as an emergency fuel electrical generator engine).

The special injector 11 of FIG. 22 has the needle 11A in the closed position, while in FIG. 23, the needle 11A is in open position so to enable a water jet J to flow outside the injector 11 through the passage 11P. The injector 11 is connected to one or more water supply tanks (60 in FIG. 20) adapted for containing high pressurized water, such as water with a pressure of $200 \times 10^5$ Pa.

Water present within the injector 11 of FIG. 22 has thus a constant pressure of about $200 \times 10^5$ Pa, as no water is flowing through the injector.

The needle 11A of the injector 11 is held in the closed position by a trigger 11T, against the action of the spring 11S (compressed to the maximum). The trigger is controlled by an electromagnet 11M controlled by the network voltage. The trigger 11T comprises a pivoting lever 11L pivoting around the axis 11LA, said pivoting lever comprising a first portion 11L1 with an abutting element 11LB adapted for contacting an end part 11AE of the needle 11A, for maintaining the needle in closed position, despite the action of the spring 11S on the end part 11AE of the needle 11A.

When the network is correctly supplied with a power PX at the time Tt, a computer system will determine parameters of the water jet J required for acting on the Pelton turbine 1 whereby generating via the alternator in case of break the required power PX. By determining said parameter of the water jet J, the computer can determine the required passage outlet 11P of the injector, and the position of a pushing element 11JP of a jack 11J, for defining a gap δ corresponding to the maximum required movement of the needle 11A for achieving the required passage outlet 11P for generating the required water jet J. The pushing element 11JP of the jack 11J is away from the end part 11AE of the needle 11A with formation of the gap δ. Said position of the pushing element will act as abutment for end part 11AE when the abutting element 11LB is no more in position for maintaining the needle 11A in closed position. In FIG. 22, the turbine 1 is at synchronism speed, but the injector (FIG. 20) is closed and no power by the Pelton turbine.

For maintaining the lever 11L in its position shown in FIG. 22, a spring 11LS acts on the second portion 11L2 of the lever 11L. The pivoting of the lever is controlled by an electromagnet 11M adapted pivot the lever against the action of the spring 11LS.

In fact, the computer will determine the required gap δ in function of the instantaneous power delivered by the normal network to the consumer.

In case of a sudden loss of power at a precise moment, without any delay, the electromagnet 11M is activated for generating a small pivoting or tilting of the lever 11L against the action of the spring 11LS, whereby placing the abutting element 11LB in a position for which the abutting element 11LB is no more opposing the movement of the needle 11A due to the action of the spring 11S. Due to the instantaneous tilting of the lever 11L, the movement of the needle 11A from its position of FIG. 22 to its position of FIG. 23 is instantaneous. In FIG. 23, the end part 11AE of the needle 11A abuts against the pushing element 11JP of the jack 11J. The movement of the needle 11A corresponds to the gap δ determined by as a function of the instantaneous power supply, i.e., just before an electric supply break. Said movement of the needle 11A cause the formation of a passage outlet 11P adapted for the flow of a water jet towards the Pelton turbine for driving into rotation the alternator 2 at the right speed for generating exactly the determined required power network. In case of variation of required network power, the jack 11J can adapt the position of the pusher 11JP and thus of the needle 11A.

Depending on the power delivered by the network to the consumer, the value of δ is constantly adapted. Between the time of a network cutoff or break and the reappearance of power generated by the alternator driven into rotation by the Pelton turbine, a very short period E elapses. During said short period of time, the alternator is driven into rotation by the working of the rotating flywheel FW. The power generation during said short period of time E is take over by the rotation of the flywheel.

The consumer will thus not notice the disappearance of the network power during said period of time a Energy supplied by the flywheel to the alternator, before energy is fully supplied by the Pelton turbine to the alternator, will have the effect of reducing the speed of rotation of said flywheel by a few revolutions per minute during said period of time ε.

Consequently, the frequency may decrease by a few fraction of one percent depending on the said short period of time ε. Depending on the type of consumption, the value of the period of time ε can be adapted according to the types of consumer requirements. As soon as the network power is provided by the Pelton turbine, the water jet J will be controlled in function of the instantaneous required power.

The aim of the no break unit is to achieve a continuous power supply to an installation corresponding to the required power, before the generator G is working back correctly or before an emergency generator, such as a fuel generator engine is taking over the supply of power to the network as required.

The injector 11 of FIG. 23 is supplied by a water tank under a variable pressure varying between a maximum pressure P1 (for example $200 \times 10^5$ Pa) and a minimal pressure P2 (for example $150 \times 10^5$ Pa), depending on the needs of the consumer. The volume of the tank is adapted for generating a Pelton turbine duration is for example at least 30 seconds, such as from 30 seconds to 2 minutes. The aim of the no break unit is that as soon as the pressure in the water tank reaches the minimum pressure P2, an emergency generator takes over the electrical supply of the network to ensure network power for the duration of the cut-off of the normal power supply, said cut-off can take several minutes.

In case the network cut-off time does not allow the pressure in the water tank to drop up to the minimal pressure P2, meaning a very short the cut-off time of the normal supply network, the emergency generator have not be started. More than 90% of network supply breaks last less than 20 seconds. When the energy stored in the water tank is sufficient for supplementing required power for more than 20 seconds, there is no need to start the emergency generator. This saves on starting the emergency generator at full power. This enables to prevent a lot of pollution issues, such as unburned compounds, CO, NOx, SO2, etc.

When the network fault has disappeared (possibly due to the emergency generator), and whatever the pressure of the water in the injector 11, the jack 11J is pushing the needle 11A to its closed position (FIG. 22) so as to prevent the passage of water through the injector 11. The spring 11S is in its maximum compression state. The electromagnet 11M is no more activated, whereby the spring 11LS acts on the second lever portion 11L2. The abutting element 11LB of the first portion of the lever 11L is placed back in a position for maintaining the needle 11A in its closed position. The trigger system 11T is placed back in its locking position (FIG. 22). The computer can then determined a new gap in function of the instantaneous power requirement for adapting the position of the pushing element 11JP. The pushing element 11JP of the jack 11J is placed back in the variable position of FIG. 22, depending on the instantaneous power requirement, so as to be ready in case of a new power break.

A pump driven by the emergency generator or by the re-established power network can reconstitutes the initial pressure P1 in the water tank.

The invention claimed is:

1. A turbine unit comprising a hydraulic turbine of the Pelton type (1) adapted to drive an alternator (2) with a determined net rated power of 5 to 1000 KW by at least one water jet (J) issuing from a water injector along a central axis of the water jet (Ajet), said at least one water jet (J) having a maximum size defined by a jet diameter (djet) and a variable effective hydraulic pressure (Peff) lower than a maximum effective hydraulic pressure (PMax) equivalent to a determined waterfall height (HMax) comprised between 70 and 500 m, in which the said hydraulic turbine (1) comprises at least:

a body (10) of the turbine (1), said body (10) bearing a rotating shaft defining an axis of rotation (4);

a wheel (3) with a periphery (30) of diameter (D) comprised between 300 mm and 2000 mm, said wheel (3) being mounted on the said rotating shaft whereby the wheel is rotating relative to the turbine body (10) about the said axis of rotation (4);

a series of buckets (5) mounted in a regular manner along the periphery (30) of the wheel (3), each bucket (5) having the shape of two half-shells (50, 51) symmetrical with respect to a plane of symmetry (6), said half-shells (50, 51) defining a peripheral edge (5A, 5P) extending substantially in a plane (P5P), said half-shells (50, 51) being bound to each other along a central rib (52) located in the plane of symmetry (6), each bucket (5) having a free end wall (53) remote from the periphery (30) of the wheel (3), said free end wall (53) being provided with a notch (54) whose size is greater than the maximum size of the water jet (J) of the injector (11), each half-shell (50, 51) having a bottom (50A, 51A), while the notch (54) of a bucket (5) defines an opening (54) to each half-shell (50, 51) of the bucket (5) in consideration;

at least one water injector (11) adapted to direct at least the water jet (J) successively towards at least one bucket of the series of buckets (5) of the wheel (3) for driving the wheel into rotation around the said axis of rotation (4), said at least one water injector (11) defining a passage outlet (11P) characterized by an outlet diameter (ds) corresponding substantially to the jet diameter (djet) of the water jet (J) leaving the injector (11), in which the said at least one water injector is arranged with respect to the buckets of the wheel (3) so that the central axis of the water jet (J) issuing from the said at least one injector (11) towards successively at least one bucket of the series of buckets (5) is tangent to a turbine circle (CT) having a centre located on the axis of rotation (4) of the wheel (3) and having a turbine diameter (DT) greater than the diameter (D) of the periphery (30) of the wheel (3), in which the said at least one water injector (11) is a variable flow rate injector with a variable passage outlet (11P) defining a variable outlet diameter (ds) able to vary at least between at least a first outlet diameter (ds1) to ensure a first flow rate of water leaving the variable flow rate injector (11) adapted for a first hydraulic pressure (P1) corresponding to the maximum hydraulic pressure (PMax), and a second outlet diameter (ds2) at least 20% greater than said first outlet diameter (ds1) adapted for a second hydraulic pressure (P2) at least 30% lower than the maximum hydraulic pressure (PMax), in which a number of buckets (5) is from 19 to 33, in which the half-shells (50, 51) of each bucket (5) each define a cavity (50C, 51C) characterized by (a) a maximum width (Lmax) measured perpendicular to the plane of symmetry (6) comprised between 1.3 and 1.9 times said second outlet diameter (ds2) of the variable flow rate injector (11), (b) a maximum length (lmax) measured parallel to the plane of symmetry (6) comprised between 2.2 and 3 times said second outlet diameter (ds2) of the variable flow rate injector (11), and (c) at least one deepest point (C50, C51) located at a maximum depth (Pmax) from the plane (P5P) of the peripheral edge (5A, 5P) comprised between 0.8 and 1.2 times said second outlet diameter (ds2) of the injector (11), said maximum depth (Pmax) being measured along a line parallel to the plane of symmetry (6) and perpendicular to the plane (P5P) of the peripheral edge (5A, 5P), in which the notch (54) of each bucket (5) has two lateral edges (54A, 54B) with remote end parts separated from each other by a distance (d54) comprised between 1 and 1.2 times said second outlet diameter (ds2) of the variable flow rate injector (11), and in which each bucket (5) has an outer face (5SE) opposite to the cavities (50C, 51C), said outer face (5SE) having a longitudinal channel (15) located under the central rib (52), said longitudinal channel (15) having a bottom with at least a part (15p) located between a first longitudinal plane (P1) perpendicular to the plane of symmetry (6) and extending through the deepest points (C50, C51) of the cavities (50C, 51C), and a second longitudinal plane (P2) perpendicular to the plane of symmetry (6) and intersecting the central rib (52).

2. The turbine unit of claim 1, in which the said second longitudinal plane (P2) perpendicular to the plane of symmetry (6) and intersecting the central rib (52) is a plane selected from the group consisting of planes intersecting the notch (54) perpendicular to the plane of symmetry (6), and a plane perpendicular to the plane of symmetry (6) tangent to the notch (54) adjacent to the deepest points (C50, C51) of the bottom of the cavities (50C, 51C).

3. The turbine unit of claim 1, in which the number of buckets is selected from odd numbers of the group consisting of 23, 25, 27, 29, 31 and 33.

4. The turbine of claim 1, in which the at least one water injector is selected from the group consisting of one single water injector being a variable flow rate injector, two water injectors being each a variable flow rate injector, and three water injectors being each a variable flow rate injector.

5. The turbine unit of claim 1, comprising a single water injector being a variable flow rate injector.

6. The turbine unit of claim 1, in which the variable flow rate injector is provided with a water jet axis modification means for modifying the central axis of the water jet issuing from the variable flow rate injector (11) substantially parallel to a predetermined axis, in which the water jet axis modification means is selected from the group consisting of:

a variable passage outlet (11P) of the variable flow rate injector (11) varying at least between, on the one hand, a first passage outlet with a first outlet diameter (ds1) adapted for ensuring a first water jet issuing from the variable flow rate injector (11) with a first hydraulic pressure (P1) corresponding to the maximum hydraulic pressure (PMax), said first water jet leaving the variable flow rate injector (11) along a first jet axis (djet1) located at a first distance (dd1) from the axis of rotation (4) of the wheel (3), and, on the other hand, a second passage outlet with a second outlet diameter (ds2) which is at least 20% greater than said first outlet diameter (ds1), said second passage outlet being adapted for ensuring a second water jet issuing from the variable flow rate injector with a second hydraulic pressure (P2) which is at least 30% lower than the maximum hydraulic pressure (PMax), said second water jet leaving the variable flow rate injector along a second jet axis (djet2) substantially parallel to said first jet axis (djet1) and located at a second distance (dd2) from the axis of rotation (4) of the wheel (3), said second distance (dd2) being greater than said first distance (dd1), a movable support (120) relative to the turbine body (10), said movable support bearing the variable flow rate injector (11), whereby the movable support (120) is at least movable between a first support position adapted for ensuring a first water jet (J) leaving the variable flow rate injector (11) along a first jet axis (djet1) located at a first distance (dd1) from the axis of rotation (4) of the wheel (3), and a second support position adapted for ensuring a second water jet (J) leaving the variable flow rate injector (11) along a second jet axis (djet2) located at a second distance (dd2) from the axis of rotation (4) of the wheel (3) which is greater than the said first distance (dd1), whereby said second jet axis (djet2) is parallel to the first jet axis (djet1), and combination thereof.

7. The turbine unit of claim 6, in which the second distance (dd2) is at most 1.1 times the said first distance (dd1).

8. The turbine unit of claim 6, which further comprises at least one sensor selected from the group consisting of a vibration sensor, a cavitation sensor, and a combination thereof, as well as at least one control device adapted for modifying the variable outlet diameter (ds) of the variable passage outlet (11) by following at least one pre-established curve selected from the group consisting curves pre-established based on turbine vibrations for at least one series of different water flow rates and for at least one series of different water pressures, curves pre-established based on turbine cavitations for at least one series of different water flow rates and for at least one series of different water pressures, curves pre-established based on turbine vibrations and turbine cavitations for at least one series of different water flow rates and for at least one series of different water pressures, and combination thereof, so as to adapt at least one variable element selected from the group consisting of a variable element modifying the variable passage outlet of the variable passage outlet (11P), a variable element of the water jet axis modification means, and combination thereof, so as to reduce at least one of the group consisting of cavitations and vibrations, while ensuring a turbine efficiency greater than 88%.

9. The turbine unit of claim 1, which is provided with a controller for the variable flow rate injector for modifying the variable outlet passage (11P) in function of a given hydraulic pressure comprised between the first hydraulic pressure (P1) and the second hydraulic pressure (P2), so that for said given hydraulic pressure, the variable outlet passage has an outlet diameter at least substantially function of the ratio of maximum hydraulic pressure to said given hydraulic pressure, to the power of ¾.

10. The turbine unit of claim 1, in which the variable flow rate injector is provided with a water jet axis modification means for modifying the central axis of the water jet issuing from the variable flow rate injector (11) substantially parallel to a predetermined axis, while the turbine is provided (a) with a water pressure sensor for determining a pressure parameter function of the variable effective hydraulic pressure of the said at least one water jet issuing from the variable flow rate injector, as well as (b) with a controller for the water jet axis modification means for adapting the position of the central axis of the water jet with respect to the axis of rotation (4) of the wheel (3) in function of the pressure parameter determined by the water pressure sensor.

11. The turbine unit of claim 1, whereby said turbine unit further comprises:
    at least one supply reservoir selected from the group consisting of supply tanks for storing water with a maximum hydraulic pressure of between $15\times10^5$ Pa and $250\times10^5$ Pa and supply basin with a maximum waterfall height of between 150 m and 500 m,
    at least one alternator with at least one driving shaft for driving into rotation a rotatable part of the alternator,
    at least one kinematic device connecting the rotating shaft of the turbine to the driving shaft of the alternator, and
    at least one pipe for bringing water from the said at least one supply reservoir to the said at least one water injector (11).

12. The turbine unit of claim 11, in which the turbine unit further comprises:
    a collecting reservoir adapted to collect water from the at least one supply reservoir after said water has been directed towards successively at least one bucket of the wheel of the turbine, and
    a pumping device for bringing water back from the collecting reservoir to the at least one supply reservoir.

13. The turbine unit of claim 11, in which the turbine unit further comprises:
    a collecting reservoir adapted to collect water from the at least one supply reservoir after said water has been directed towards successively at least one bucket of the wheel of the variable flow rate turbine,
    an electrical driven pumping device for bringing water back from the collecting reservoir to the at least one supply reservoir, and
    a device for supplying electric current to the electrical driven pumping device, said device for supplying electric energy being selected from the group consisting of photovoltaic panels and wind turbines.

14. The turbine unit of claim 1 adapted for acting an electrical no break unit for supplying an electric consuming installation in case of an electric supply break from a supply network with a nominal network power, whereby the at least one water injector (11) is associated to a controlled supply valve adapted to control at least the valve passage at least between a first valve passage adapted for enabling a first water flow rate into the at least one water injector (11) for a considered variable effective hydraulic pressure, and a second valve passage adapted for enabling a second water flow rate into the said at least one water injector for the said considered variable effective pressure, whereby said second water flow is at least lower than 50% of the said first water flow rate,
    whereby said controlled supply valve is associated to a trigger control element for enabling the passage of the controlled supply valve from its second valve passage to its first valve passage in less than 100 milliseconds.

15. The turbine unit of claim 14, in which the trigger control element is selected from the group consisting of magnetic trigger control element and electromagnetic trigger control element, said trigger control element being adapted for enabling the passage of the controlled supply valve from its second valve passage to its first valve passage in less than 50 milliseconds.

16. The turbine unit of claim 14, which further comprises a flywheel mounted on the said rotating shaft of the wheel (3).

17. The turbine unit of claim 14, in which the first valve passage is pre-established in function of the nominal network power.

18. The turbine unit of claim 14, which comprises (a) at least one water tank adapted for containing water at a pressure higher than $50\times10^5$ Pa, (b) an alternator mechanically coupled to the said rotating shaft of the wheel (3) of the Pelton turbine, (c) a flywheel mechanically coupled to the alternator and to the said rotating shaft of the wheel (3), (d) at least one piping system for supplying water from the water tank to the controlled supply valve, whereby the said at least one water tank is adapted for containing a volume of water with a pressure higher than $50\times10^5$ Pa for driving into rotation the Pelton turbine for at least 20 seconds, whereby driving into rotation the alternator for generating for at least 20 seconds the nominal network power for supplying the electric consuming installation, and (e) an emergency engine adapted for producing the nominal network power for supplying the electric consuming installation, by driving into rotation the alternator, when the alternator is no more driven into rotation by the rotation of the Pelton turbine due to the water jet issued from said at least one injector.

19. A method for producing electrical energy from potential energy contained water supplied from at least one supply reservoir selected from the group consisting of supply tanks for storing water with a maximum hydraulic pressure of between 7×105 Pa and 250×105 Pa and supply basins with a maximum waterfall height of between 70 m and 500 m,
    whereby said method uses a turbine unit comprising at least one hydraulic turbine of the Pelton type (1) adapted to drive an alternator (2) with a determined net rated power of 5 to 1000 KW by at least one water jet (J) issuing from a water injector along a central axis of the water jet (Ajet), said at least one water jet (J) having a maximum size defined by a jet diameter (djet) and a variable effective hydraulic pressure (Peff) lower than a maximum effective hydraulic pressure (PMax) equivalent to a determined waterfall height (HMax) comprised between 70 and 500 m, in which the said at least one hydraulic turbine of the Pelton type (1) comprises at least:
    a body (10) of the at least one turbine of the Pelton type (1), said body (10) bearing a rotating shaft defining an axis of rotation (4);

a wheel (3) with a periphery (30) of diameter (D) comprised between 300 mm and 2000 mm, said wheel (3) being mounted on the said rotating shaft whereby the wheel is rotating relative to the turbine body (10) about the said axis of rotation (4);

a series of buckets (5) mounted in a regular manner along the periphery (30) of the wheel (3), each bucket (5) having the shape of two half-shells (50, 51) symmetrical with respect to a plane of symmetry (6), said half-shells (50, 51) defining a peripheral edge (5A, 5P) extending substantially in a plane (P5P), said half-shells (50, 51) being bound to each other along a central rib (52) located in the plane of symmetry (6), each bucket (5) having a free end wall (53) remote from the periphery (30) of the wheel (3), said free end wall (53) being provided with a notch (54) whose size is greater than the maximum size of the water jet (J) of the injector (11), each half-shell (50,51) having a bottom (50A, 51A), while the notch (54) of a bucket (5) defines an opening (54) to each half-shell (50, 51) of the bucket (5) in consideration;

at least one water injector (11) adapted to direct at least the water jet (J) successively towards at least one bucket of the series of buckets (5) of the wheel (3) for driving the wheel into rotation around the said axis of rotation (4), said at least one water injector (11) defining a passage outlet (11P) characterized by an outlet diameter (ds) corresponding substantially to the jet diameter (djet) of the water jet (J) leaving the injector (11), in which the said at least one water injector is arranged with respect to the buckets of the wheel (3) so that the central axis of the water jet (J) issuing from the said at least one injector (11) towards successively at least one bucket of the series of buckets (5) is tangent to a turbine circle (CT) having a centre located on the axis of rotation (4) of the wheel (3) and having a turbine diameter (DT) greater than the diameter (D) of the periphery (30) of the wheel (3), in which the said at least one water injector (11) is a variable flow rate injector with a variable passage outlet (11P) defining a variable outlet diameter (ds) able to vary at least between at least a first outlet diameter (ds1) to ensure a first flow rate of water leaving the variable flow rate injector (11) adapted for a first hydraulic pressure (P1) corresponding to the maximum hydraulic pressure (PMax), and a second outlet diameter (ds2) at least 20% greater than said first outlet diameter (ds1) adapted for a second hydraulic pressure (P2) at least 30% lower than the maximum hydraulic pressure (PMax), in which a number of buckets (5) is from 19 to 33,
in which the half-shells (50, 51) of each bucket (5) each define a cavity (50C, 51C) characterized by
(a) a maximum width (Lmax) measured perpendicular to the plane of symmetry (6) comprised between 1.3 and 1.9 times said second outlet diameter (ds2) of the injector (11),
(b) a maximum length (lmax) measured parallel to the plane of symmetry (6) comprised between 2.2 and 3 times said second outlet diameter (ds2) of the injector (11), and
(c) at least one deepest point (C50, C51) located at a maximum depth (Pmax) from the plane (P5P) of the peripheral edge (5A, 5P) comprised between 0.8 and 1.2 times said second outlet diameter (ds2) of the injector (11), said maximum depth (Pmax) being measured along a line parallel to the plane of symmetry (6) and perpendicular to the plane (P5P) of the peripheral edge (5A, 5P), in which the notch (54) of each bucket (5) has two lateral edges (54A, 54B) with remote end parts separated from each other by a distance (d54) comprised between 1 and 1.2 times said second outlet diameter (ds2) of the injector (11), in which each bucket (5) has an outer face (5SE) opposite to the cavities (50C, 51C), said outer face (5SE) having a longitudinal channel (15) located under the central rib (52), said longitudinal channel (15) having a bottom with at least a part (15p) located between a first longitudinal plane (P1) perpendicular to the plane of symmetry (6) and extending through the deepest points (C50,C51) of the cavities (50C, 51C), and a second longitudinal plane (P2) perpendicular to the plane of symmetry (6) and intersecting the central rib (52), in which the said turbine unit further comprises:
at least one supply reservoir selected from the group consisting of supply tanks for storing water with a maximum hydraulic pressure of between 7×10⁵ Pa and 250×10⁵ Pa and supply basin with a maximum waterfall height of between 70m and 500m,
at least one alternator with at least one driving shaft for driving into rotation a rotatable part of the alternator,
at least one kinematic device connecting the rotating shaft of the variable flow rate turbine to the driving shaft of the alternator, and
at least one pipe for bringing water from the said at least one supply reservoir to the said at least one water injector, in which said method comprises at least the following steps:
supplying water from the at least one supply reservoir to the said at least one water injector via the at least one pipe;
directing at least the water jet (J) from the at least one water injector (11) successively towards at least one bucket of the series of buckets of the wheel (3), so as to drive the wheel into rotation around the axis of rotation (4), while driving into rotation the rotatable part of the alternator via the at least one kinematic device; and
producing electrical energy by rotating the rotatable part of the alternator.

20. The method of claim 19, for which the turbine unit further comprises:
a collecting reservoir adapted to collect water from the at least one supply reservoir after said water has been directed towards successively at least one bucket of the wheel of the variable flow rate turbine, and
a pumping device for bringing water back from the collecting reservoir to the at least one supply reservoir, said method further comprising the following steps:
collecting water from the at least one water jet directed successively towards at least one bucket of the series of buckets of the wheel (3) of the variable flow rate turbine into the collecting reservoir, and
pumping via the pumping device, water from the collecting reservoir for bringing water back to the at least one supply reservoir, for storing said water as potential energy in the at least one supply reservoir.

21. The method of claim 20, for which the turbine unit further comprises:
an electric supply device for supplying electric current to the electrical driven pumping device, said electric supply device for supplying electric energy being selected from the group consisting of photovoltaic panels and wind turbines, said method further comprising the steps of:
producing electric energy from the electric supply device;
conducting at least a portion of said electric energy produced from the electric supply device to the pumping device for pumping water at least from the collecting reservoir and for bringing water back to the at least one supply reservoir, for storing said water as potential energy in the at least one supply reservoir.

22. The method of claim 19, for producing electrical energy from variable potential energy contained in water supplied from at least one supply reservoir, whereby said variable potential energy is able to incur at least one potential energy drop selected from the group consisting of (a) a drop height comprised between 20 m and 300 m for supply basins with a maximum waterfall height of between 70 m and 500 m, and (b) a hydraulic pressure drop comprised between 2×105 Pa and 30×105 Pa for supply tanks storing water with a maximum hydraulic pressure of between 7×105 Pa and 250×105 Pa,
in which the step of directing at least the water jet (J) from the at least one water injector (11) successively towards at least one bucket of the series of buckets of the wheel (3) is controlled for adapting the flow rate of water directed successively towards at least one bucket of the series of buckets of the wheel (3), so as to ensure a turbine efficiency of at least 88% for the said at least one variable flow rate turbine, despite the at least one potential energy drop.

23. The method of claim 19, for producing electrical energy from variable potential energy contained in water supplied from at least one supply reservoir, whereby said variable potential energy is able to incur at least one potential energy drop selected from the group consisting of (a) a drop height comprised between 20 m and 300 m for supply basins with a maximum waterfall height of between 70 m and 500 m, and (b) a hydraulic pressure drop comprised between 2×105 Pa and 30×105 Pa for supply tanks storing water with a maximum hydraulic pressure of between 7×105 Pa and 250×105 Pa,
in which the step of directing at least the water jet (J) from the at least one water injector (11) successively towards at least one bucket of the series of buckets of the wheel (3) is controlled for adapting the flow rate of water directed successively towards at least one bucket of the series of buckets of the wheel (3), so as to ensure a turbine efficiency of at least 90% for the said at least one variable flow rate turbine, despite the at least one potential energy drop.

24. The method of claim 19, in which the number of buckets is selected from odd numbers of the group consisting of 23, 25, 27, 29, 31 and 33.

25. The method of claim 19, in which the at least one water injector (11) is selected from the group consisting of
one single water injector being a variable flow rate injector for directing one water jet successively towards at least one bucket (5) of the series of buckets of the wheel (3),
two water injectors being a first variable flow rate injector directing a first water jet successively towards at least one bucket (5) of the series of buckets of the wheel (3), and a second variable flow rate injector directing a second water jet successively towards at least one bucket (5) of the series of buckets of the wheel (3), whereby the first water jet and the second water jet are distant from each other, and
three water injectors being a first variable flow rate injector directing a first water jet successively towards at least one bucket (5) of the series of buckets of the wheel (3), a second variable flow rate injector directing a second water jet successively towards at least one bucket (5) of the series of buckets of the wheel (3), and a third variable flow rate injector directing a third water jet successively towards at least one bucket (5) of the series of buckets of the wheel (3) whereby the first water jet, the second water jet and the third water jet are distant from each other.

26. The method of claim 19, in which the variable flow rate injector (11) is connected to a control device modifying the variable outlet diameter (ds) at least as a function of the variable effective hydraulic pressure (Peff), in order to ensure a flow rate of water directed successively towards at least one bucket (5) of the said series of buckets (5) selected from the group consisting of a water flow rate substantially equal to a predetermined water flow rate and a water flow rate comprised within a range of water flow rates varying between 0.9 and 1.1 times a predetermined water flow rate, said method comprising at least the following steps:
determining the variable effective hydraulic pressure,
determining an adapted outlet diameter at least as a function of the variable effective hydraulic pressure (Peff), in order to ensure a flow rate of water directed successively towards at least one bucket (5) of the said series of buckets (5) selected from the group consisting of a water flow rate substantially equal to a predetermined water flow rate and a water flow rate comprised within a range of water flow rates varying between 0.9 and 1.1 times a predetermined water flow rate, and
adapting the variable outlet diameter (ds) to the determined adapted outlet diameter.

27. The method of claim 19, in which the variable flow rate injector (11) is provided with a water jet axis modification means for modifying the central axis of the water jet issuing from the variable flow rate injector (11) substantially parallel to a predetermined axis, as at least as a function of the variable effective hydraulic pressure (Peff) in order to ensure a turbine efficiency of more than 88%, said method comprising at least the following steps:
determining the variable effective pressure,
determining an adapted central axis of the water jet issuing from the variable flow rate injector so as to ensure a turbine efficiency of more than 88%, and
controlling the water jet axis modification means to adapt the central axis of the water jet of the variable flow rate injector to the determined adapted central axis.

28. The method of claim 27, in which the water jet axis modification means is selected from the group consisting of:
a variable passage outlet (11P) of the variable flow rate injector (11) varying at least between, on the one hand, a first passage outlet with a first outlet diameter (ds1) adapted for ensuring a first water jet issuing from the variable flow rate injector (11) with a first hydraulic pressure (P1) corresponding to the maximum hydraulic pressure (PMax), said first water jet leaving the variable flow rate injector (11) along a first jet axis (djet1) located at a first distance (dd1) from the axis of rotation (4) of the wheel (3), and, on the other hand, a second passage outlet with a second outlet diameter (ds2) which is at least 20% greater than said first outlet diameter (ds1), said second passage outlet being adapted for ensuring a second water jet issuing from the variable flow rate injector with a second hydraulic pressure (P2) which is at least 30% lower than the maximum hydraulic pressure (PMax), said second water jet leaving the variable flow rate injector along a second jet axis (djet2) substantially parallel to said first jet axis (djet1) and located at a second distance (dd2) from the axis of rotation (4) of the wheel (3), said second distance (dd2) being greater than said first distance (dd1), a movable support (120) relative to the turbine body (10), said movable support bearing the variable flow rate injector (11), whereby the movable support (120) is at least movable between a first support position adapted for ensuring a first water jet (J) leaving the variable flow rate injector (11) along a first jet axis (djet1) located at a first distance (dd1) from the axis of rotation (4) of the wheel (3), and a second support position adapted for ensuring a second water jet (J) leaving the variable flow rate injector (11) along a second jet axis (djet2) located at a second distance (dd2) from the axis of rotation (4) of the wheel (3) which is greater than the said first distance (dd1), whereby said second jet axis (djet2) is parallel to the first jet axis (djet1), and combination thereof.

29. The method of claim 28, in which the second distance (dd2) is at most 1.1 times the said first distance (dd1), whereby the step of determining an adapted central axis of the water jet issuing from the variable flow rate injector so as to ensure a turbine efficiency of more than 88% is a step determining an adapted central axis located at a distance from the axis of rotation (4) of the wheel comprised between the first distance (dd1) and the second distance (dd2).

30. The method of claim 28, in which the turbine unit further comprises at least one sensor selected from the group consisting of a vibration sensor, a cavitation sensor, and a combination thereof, as well as at least one control device adapted for modifying the variable outlet diameter (ds) of the variable passage outlet (11) by following at least one pre-established curve selected from the group consisting curves pre-established based on turbine vibrations for at least one series of different water flow rates and for at least one series of different water pressures, curves pre-established based on turbine cavitations for at least one series of different water flow rates and for at least one series of different water pressures, curves pre-established based on turbine vibrations and turbine cavitations for at least one series of different water flow rates and for at least one series of different water pressures, and combination thereof, so as to adapt at least one variable element selected from the group consisting of a variable element modifying the variable passage outlet of the variable passage outlet (11P), a variable element of the water jet axis modification means, and combination thereof, so as to reduce at least one of the group consisting of cavitations and vibrations, while ensuring a turbine efficiency greater than 88%, said method comprising at least the following steps:
determining a sensor parameter selected from the group consisting vibration parameter, cavitation parameter and combinations thereof from the said at least one sensor,
determining the variable effective pressure of the water jet (J),
determining at least partly from the said at least one pre-established curve, at least one determined variable element selected from the group consisting of a determined variable element modifying the variable passage outlet of the variable passage outlet (11P), a determined variable element of the water jet axis modification means, and combination thereof, so as to reduce at least one of the group consisting of cavitations and vibrations, while ensuring a turbine efficiency greater than 88%,
adapting the variable element to the determined variable element.

31. The method of claim 19, for which the turbine unit is provided with a controller for the variable flow rate injector for modifying the variable outlet passage (11P) in function of a given hydraulic pressure comprised between the first hydraulic pressure (P1) and the second hydraulic pressure (P2), so that for said given hydraulic pressure, the variable outlet passage has an outlet diameter at least substantially function of the ratio of maximum hydraulic pressure to said given hydraulic pressure, to the power of ¾, said method comprising the steps of:
determining the variable effective hydraulic pressure of the water jet (J),
determining an adapted outlet diameter for the variable outlet passage at least as substantially function of the ratio of maximum hydraulic pressure to said determined variable effective hydraulic pressure, to the power of ¾, and
adapting the variable outlet passage (11P) to the determined adapted outlet diameter.

32. The method of claim 19, in which the at least one water injector (11) is associated to a controlled supply valve adapted to control at least the valve passage at least between a first valve passage adapted for enabling a first water flow rate into the at least one water injector (11) for a considered variable effective hydraulic pressure, and a second valve passage adapted for enabling a second water flow rate into the said at least one water injector for the said considered variable effective pressure, whereby said second water flow is at least lower than 50% of the said first water flow rate, whereby said controlled supply valve is associated to a trigger control element for enabling the passage of the controlled supply valve from its second valve passage to its first valve passage in less than 100 milliseconds, said method comprising the following steps:
receiving an electric supply defect information from an electric supply unit supplying an electric consuming installation, said electric supply defect information being selected from the group consisting of electric break from the electric supply unit and electric shortage from the electric supply;
activating the trigger control element for adapting the valve passage of the controlled supply valve from its second valve passage to its first valve passage in less than 100 milliseconds;
supplying the at least one water injector (11) with a first flow rate for generating a water jet at least towards one bucket of the series of buckets of the wheel (3), whereby driving into rotation the rotatable part of the alternator and generating electricity at least for supplying the electric consuming installation.

33. The method of claim 32, for which the turbine unit further comprises a flywheel mounted on the said rotating shaft of the wheel (3), said method comprising at least the following steps:
maintaining the flywheel and the wheel (3) in rotation at an appropriate rotation speed;
in case of receipt of the electric supply defect information, supplying water to the at least one water injector (11), for driving into rotation the rotatable part of the alternator and generating electricity, while ensuring the flywheel and the wheel to further rotate around the axis of rotation (4) at a speed substantially equal to the appropriate speed.

34. The method of claim 19, in which the turbine unit is operated as an electric no break unit.

35. A bucket wheel assembly suitable for a turbine unit comprising a hydraulic turbine of the Pelton type (1) adapted to drive an alternator (2) with a determined net rated power of 5 to 1000 KW by at least one water jet (J) issuing from a water injector along a central axis of the water jet (Ajet), said at least one water jet (J) having a maximum size defined by a jet diameter (djet) and a variable effective hydraulic pressure (Peff) lower than a maximum effective hydraulic pressure (PMax) equivalent to a determined waterfall height (HMax) comprised between 70 and 500 m, in which the said hydraulic turbine (1) comprises at least:

a body (10) of the turbine (1), said body (10) bearing a rotating shaft defining an axis of rotation (4);

a wheel (3) with a periphery (30) of diameter (D) comprised between 300 mm and 2000 mm, said wheel (3) being mounted on the said rotating shaft whereby the wheel is rotating relative to the turbine body (10) about the said axis of rotation (4);

a series of buckets (5) mounted in a regular manner along the periphery (30) of the wheel (3), each bucket (5) having the shape of two half-shells (50,51) symmetrical with respect to a plane of symmetry (6), said half-shells (50,51) defining a peripheral edge (5A, 5P) extending substantially in a plane (P5P), said half-shells (50,51) being bound to each other along a central rib (52) located in the plane of symmetry (6), each bucket (5) having a free end wall (53) remote from the periphery (30) of the wheel (3), said free end wall (53) being provided with a notch (54) whose size is greater than the maximum size of the water jet (J) of the injector (11), each half-shell (50, 51) having a bottom (50A, 51A), while the notch (54) of a bucket (5) defines an opening (54) to each half-shell (50,51) of the bucket (5) in consideration;

at least one water injector (11) adapted to direct at least the water jet (J) successively towards at least one bucket of the series of buckets (5) of the wheel (3) for driving the wheel into rotation around the said axis of rotation (4), said at least one water injector (11) defining a passage outlet (11P) characterized by an outlet diameter (ds) corresponding substantially to the jet diameter (djet) of the water jet (J) leaving the injector (11), in which the said at least one water injector is arranged with respect to the buckets of the wheel (3) so that the central axis of the water jet (J) issuing from the said at least one injector (11) towards successively at least one bucket of the series of buckets (5) is tangent to a turbine circle (CT) having a centre located on the axis of rotation (4) of the wheel (3) and having a turbine diameter (DT) greater than the diameter (D) of the periphery (30) of the wheel (3), in which the said at least one water injector (11) is a variable flow rate injector with a variable passage outlet (11P) defining a variable outlet diameter (ds) able to vary at least between at least a first outlet diameter (ds1) to ensure a first flow rate of water leaving the variable flow rate injector (11) adapted for a first hydraulic pressure (P1) corresponding to the maximum hydraulic pressure (PMax), and a second outlet diameter (ds2) at least 20% greater than said first outlet diameter (ds1) adapted for a second hydraulic pressure (P2) at least 30% lower than the maximum hydraulic pressure (PMax), in which a number of buckets is comprised between 19 and 33, in which the half-shells (50, 51) of each bucket (5) each define a cavity (50C, 51C) characterized by (a) a maximum width (Lmax) measured perpendicular to the plane of symmetry (6) comprised between 1.3 and 1.9 times said second outlet diameter (ds2) of the variable flow rate injector (11), (b) a maximum length (lmax) measured parallel to the plane of symmetry (6) comprised between 2.2 and 3 times said second outlet diameter (ds2) of the variable flow rate injector (11), and (c) at least one deepest point (C50, C51) located at a maximum depth (Pmax) from the plane (P5P) of the peripheral edge (5A, 5P) comprised between 0.8 and 1.2 times said second outlet diameter (ds2) of the injector (11), said maximum depth (Pmax) being measured along a line parallel to the plane of symmetry (6) and perpendicular to the plane (P5P) of the peripheral edge (5A, 5P), in which the notch (54) of each bucket (5) has two lateral edges (54A, 54B) with remote end parts separated from each other by a distance (d54) comprised between 1 and 1.2 times said second outlet diameter (ds2) of the variable flow rate injector (11), and in which each bucket (5) has an outer face (5SE) opposite to the cavities (50C, 51C), said outer face (5SE) having a longitudinal channel (15) located under the central rib (52), said longitudinal channel (15) having a bottom with at least a part (15p) located between a first longitudinal plane (P1) perpendicular to the plane of symmetry (6) and extending through the deepest points (C50,C51) of the cavities (50C, 51C), and a second longitudinal plane (P2) perpendicular to the plane of symmetry (6) and intersecting the central rib (52), whereby the bucket wheel assembly comprises a wheel (3) having a periphery (30) of diameter (D) comprised between 300 mm and 2000 mm, said wheel (3) being mounted or able to be mounted on a central shaft defining the axis of rotation (4).

36. The bucket wheel assembly of claim 35, in which the number of buckets of the bucket wheel assembly is selected from odd numbers of the group consisting of 19, 21, 23, 25, 27, 29, 31 and 33.

37. The bucket wheel assembly of claim 35, in which the number of buckets of the bucket wheel assembly is selected from odd numbers of the group consisting of 27, 29, 31 and 33.

* * * * *